(12) United States Patent
Boon et al.

(10) Patent No.: US 12,059,937 B2
(45) Date of Patent: Aug. 13, 2024

(54) SUSPENSION SYSTEM WITH ROLL AND PITCH STIFFNESS DEACTIVATION BASED ON ROAD PROFILE INFORMATION

(71) Applicant: DRiV Automotive Inc., Southfield, MI (US)

(72) Inventors: Peter Boon, Merchtem (BE); Bert Vandersmissen, Lovenjoel (BE); Frank Gommans, Maastricht (NL)

(73) Assignee: DRiV Automotive Inc., Northville, MI (US)

( * ) Notice: Subject to any disclaimer, the term of this patent is extended or adjusted under 35 U.S.C. 154(b) by 261 days.

(21) Appl. No.: 17/499,693

(22) Filed: Oct. 12, 2021

(65) Prior Publication Data

US 2023/0111977 A1    Apr. 13, 2023

(51) Int. Cl.
*B60G 17/00*    (2006.01)
*B60G 17/015*    (2006.01)
(Continued)

(52) U.S. Cl.
CPC ..... *B60G 17/0165* (2013.01); *B60G 17/0152* (2013.01); *B60G 17/01908* (2013.01);
(Continued)

(58) Field of Classification Search
CPC ........ B60G 2800/012; B60G 2800/014; B60G 2800/82; B60G 2202/154; B60G 2204/81;
(Continued)

(56) References Cited

U.S. PATENT DOCUMENTS

| 3,334,913 A | 8/1967 | Margala |
| 3,635,460 A | 1/1972 | Shilton et al. |

(Continued)

FOREIGN PATENT DOCUMENTS

| AU | 7393300 A | 4/2001 |
| AU | 7762000 A | 4/2001 |

(Continued)

OTHER PUBLICATIONS

International Search Report and Written Opinion regarding International Patent Application No. PCT/US2022/046029, dated Dec. 20, 2022.

(Continued)

*Primary Examiner* — Sizo B Vilakazi
*Assistant Examiner* — Sherman D Manley
(74) *Attorney, Agent, or Firm* — Harness, Dickey & Pierce, P.L.C.

(57) ABSTRACT

A suspension system and associated control methods for improving comfort by disabling passive pitch stiffness in the suspension system by holding open electromechanical comfort valves positioned in a manifold assembly of the suspension system. The manifold comfort valves are held open to disable the passive pitch stiffness of the suspension system if the vehicle is traveling down a rough road or if the vehicle is approaching a discrete road event like a pot-hole or speed bump. Deactivation of the passive pitch stiffness of the suspension system is determined based on road classification information, saved road events, and/or real-time vehicle data from on-board sensors. The suspension system therefore reduces pitch angles during pitch events induced by inertial forces caused by driver inputs and disables the pitch stiffness when the pitch event is caused by road inputs.

11 Claims, 9 Drawing Sheets

(51) Int. Cl.
*B60G 17/0165* (2006.01)
*B60G 17/019* (2006.01)

(52) U.S. Cl.
CPC .... *B60G 2202/414* (2013.01); *B60G 2400/10* (2013.01); *B60G 2400/252* (2013.01); *B60G 2400/821* (2013.01); *B60G 2401/16* (2013.01); *B60G 2500/11* (2013.01); *B60G 2800/012* (2013.01); *B60G 2800/014* (2013.01)

(58) Field of Classification Search
CPC ........ B60G 2204/8102; B60G 2204/82; B60G 2204/8304; B60G 2400/102; B60G 2400/82; B60G 2400/824; B60G 2401/14; B60G 2401/142; B60G 2401/174; B60G 11/265; B60G 21/067; B60G 21/073; B60G 21/103; B60G 17/056
See application file for complete search history.

(56) References Cited

U.S. PATENT DOCUMENTS

| | | |
|---|---|---|
| 4,076,275 A | 2/1978 | Hiruma |
| 4,270,771 A | 6/1981 | Fujii |
| 4,349,077 A | 9/1982 | Sekiguchi et al. |
| 4,390,188 A | 6/1983 | Rouse |
| 4,537,411 A | 8/1985 | Naramoto |
| 4,625,993 A | 12/1986 | Williams et al. |
| 4,830,394 A | 5/1989 | Tanaka et al. |
| 4,848,790 A | 7/1989 | Fukunaga et al. |
| 4,911,468 A | 3/1990 | Fukunaga |
| 4,911,470 A | 3/1990 | Fukunaga |
| 4,973,079 A | 11/1990 | Tsukamoto |
| 4,999,777 A | 3/1991 | Schussler et al. |
| 5,033,770 A | 7/1991 | Kamimura et al. |
| 5,037,128 A | 8/1991 | Okuyama et al. |
| 5,056,812 A | 10/1991 | Takehara et al. |
| 5,074,624 A | 12/1991 | Stauble et al. |
| 5,085,458 A | 2/1992 | Kii et al. |
| 5,085,459 A | 2/1992 | Sato et al. |
| 5,097,419 A | 3/1992 | Lizell |
| 5,100,167 A | 3/1992 | Kamimura |
| 5,119,297 A | 6/1992 | Buma et al. |
| 5,145,206 A | 9/1992 | Williams |
| 5,160,161 A | 11/1992 | Tsukamoto et al. |
| 5,162,995 A | 11/1992 | Ikemoto et al. |
| 5,174,598 A | 12/1992 | Sato et al. |
| 5,188,390 A | 2/1993 | Clark |
| 5,193,845 A | 3/1993 | Yokote et al. |
| 5,199,854 A | 4/1993 | Aoyama |
| 5,251,929 A | 10/1993 | Kawabata |
| 5,322,319 A | 6/1994 | Tanaka et al. |
| 5,515,277 A | 5/1996 | Mine |
| 5,529,324 A | 6/1996 | Krawczyk et al. |
| 5,556,115 A | 9/1996 | Heyring |
| 5,562,305 A | 10/1996 | Heyring et al. |
| 5,601,307 A | 2/1997 | Heyring et al. |
| 5,619,413 A | 4/1997 | Oakley |
| 5,630,623 A | 5/1997 | Ganzel |
| 5,631,632 A | 5/1997 | Nakashima et al. |
| 5,735,540 A | 4/1998 | Schiffler |
| 5,769,400 A | 6/1998 | Holzl et al. |
| 6,010,139 A | 1/2000 | Heyring et al. |
| 6,015,155 A | 1/2000 | Brookes et al. |
| 6,202,010 B1 | 3/2001 | Shono et al. |
| 6,259,982 B1 | 7/2001 | Williams et al. |
| 6,266,590 B1 | 7/2001 | Kutscher et al. |
| 6,282,470 B1 | 8/2001 | Shono et al. |
| 6,374,193 B1 | 4/2002 | Kutscher et al. |
| 6,470,248 B2 | 10/2002 | Shank et al. |
| 6,502,837 B1 | 1/2003 | Hamilton et al. |
| 6,519,517 B1 | 2/2003 | Heyring et al. |
| 6,556,908 B1 | 4/2003 | Lu et al. |
| 6,669,216 B1 | 12/2003 | Elser et al. |
| 6,761,371 B1 | 7/2004 | Heyring et al. |
| 6,859,713 B2 | 2/2005 | Pallot |
| 6,880,332 B2 | 4/2005 | Pfaff et al. |
| 7,040,631 B2 | 5/2006 | Kotulla et al. |
| 7,311,314 B2 | 12/2007 | Kasamatsu |
| 7,311,316 B2 | 12/2007 | Yasui et al. |
| 7,350,793 B2 | 4/2008 | Munday |
| 7,384,054 B2 | 6/2008 | Heyring et al. |
| 7,472,914 B2 | 1/2009 | Anderson et al. |
| 7,686,309 B2 | 3/2010 | Munday et al. |
| 7,789,398 B2 | 9/2010 | Munday et al. |
| 7,862,052 B2 | 1/2011 | Germain |
| 8,075,002 B1 | 12/2011 | Pionke et al. |
| 8,123,235 B2 | 2/2012 | Monk et al. |
| 8,459,619 B2 | 6/2013 | Trinh et al. |
| 8,672,337 B2 | 3/2014 | van der Knaap et al. |
| 8,695,768 B2 | 4/2014 | Kiriyama |
| 9,080,631 B2 | 7/2015 | Hoult |
| 9,150,282 B2 | 10/2015 | Heyring et al. |
| 9,428,022 B2 | 8/2016 | Coombs et al. |
| 9,597,940 B2 | 3/2017 | Anderson et al. |
| 9,829,014 B2 | 11/2017 | Kleitsch et al. |
| 10,350,958 B2 | 7/2019 | Stolle |
| 10,421,330 B2 | 9/2019 | Jeong |
| 10,752,075 B1 | 8/2020 | Shukla et al. |
| 11,220,152 B2 | 1/2022 | Witte |
| 11,390,129 B1 * | 7/2022 | Edren ................ B60G 17/0155 |
| 11,529,836 B1 * | 12/2022 | Schubart ................ B60G 13/08 |
| 11,618,294 B2 | 4/2023 | Zhao et al. |
| 11,685,220 B2 * | 6/2023 | Calchand ............ B60G 11/265 |
| | | 280/5.515 |
| 2001/0006285 A1 | 7/2001 | Franzini |
| 2003/0182990 A1 | 10/2003 | Stiller |
| 2004/0061292 A1 | 4/2004 | Hall |
| 2004/0113377 A1 | 6/2004 | Klees |
| 2005/0269753 A1 | 12/2005 | Geiger et al. |
| 2006/0151969 A1 | 7/2006 | Revill et al. |
| 2006/0186728 A1 | 8/2006 | Mizuta et al. |
| 2007/0000478 A1 | 1/2007 | Sadakane et al. |
| 2007/0278752 A1 | 12/2007 | Schedgick |
| 2008/0224428 A1 | 9/2008 | Smith et al. |
| 2008/0238004 A1 | 10/2008 | Turco et al. |
| 2008/0269987 A1 | 10/2008 | Barron et al. |
| 2008/0272561 A1 | 11/2008 | Monk et al. |
| 2009/0140501 A1 | 6/2009 | Taylor et al. |
| 2011/0025001 A1 * | 2/2011 | Kajino .................. B60G 17/08 |
| | | 280/5.515 |
| 2012/0098172 A1 | 4/2012 | Trinh et al. |
| 2013/0103259 A1 | 4/2013 | Eng et al. |
| 2013/0300073 A1 | 11/2013 | Venton-Walters et al. |
| 2014/0195114 A1 * | 7/2014 | Tseng .................. B60G 17/015 |
| | | 701/1 |
| 2014/0232082 A1 * | 8/2014 | Oshita ............... B60G 17/0162 |
| | | 280/124.161 |
| 2014/0265170 A1 * | 9/2014 | Giovanardi .......... F16K 11/065 |
| | | 280/5.5 |
| 2014/0288776 A1 | 9/2014 | Anderson et al. |
| 2015/0102921 A1 | 4/2015 | Kim |
| 2015/0224845 A1 * | 8/2015 | Anderson ................ F03G 7/08 |
| | | 701/37 |
| 2017/0240017 A1 | 8/2017 | Vandersmissen et al. |
| 2017/0291465 A1 * | 10/2017 | Christoff .................. B60G 3/20 |
| 2017/0305226 A1 | 10/2017 | Okimura |
| 2018/0194188 A1 | 7/2018 | Kasuya et al. |
| 2018/0297422 A1 | 10/2018 | Ciovnicu et al. |
| 2018/0304697 A1 | 10/2018 | Woodley et al. |
| 2018/0312017 A1 | 11/2018 | Woodley et al. |
| 2018/0345747 A1 * | 12/2018 | Boon ................... B60G 17/018 |
| 2018/0356798 A1 | 12/2018 | Ciovnicu et al. |
| 2019/0178695 A1 | 6/2019 | Bittner et al. |
| 2019/0211897 A1 | 7/2019 | Schneider et al. |
| 2019/0344634 A1 * | 11/2019 | Kim ...................... B60G 17/019 |
| 2019/0389271 A1 | 12/2019 | Zanziger |
| 2020/0062068 A1 * | 2/2020 | Trangbaek ............. B60G 17/06 |
| 2020/0094645 A1 * | 3/2020 | Edren ................... B60G 17/018 |
| 2020/0103926 A1 | 4/2020 | Apostolides |
| 2020/0122539 A1 | 4/2020 | Gummesson |
| 2020/0223274 A1 | 7/2020 | Tucker et al. |
| 2020/0247208 A1 * | 8/2020 | Kunkel .................. B60G 17/06 |
| 2020/0324607 A1 * | 10/2020 | Georgy ............ B60G 17/01908 |

(56) References Cited

U.S. PATENT DOCUMENTS

| | | | |
|---|---|---|---|
| 2021/0101434 A1* | 4/2021 | Sawarynski, Jr. | B60G 17/0165 |
| 2021/0138866 A1* | 5/2021 | Lee | B60G 17/0525 |
| 2021/0178845 A1* | 6/2021 | Cho | B60W 30/09 |
| 2021/0178850 A1* | 6/2021 | Kaldas | F16F 9/22 |
| 2021/0276566 A1* | 9/2021 | Furuta | B60W 10/20 |
| 2021/0283969 A1* | 9/2021 | Danielson | B60G 17/0165 |
| 2021/0316716 A1* | 10/2021 | Krosschell | B60W 30/02 |
| 2021/0331545 A1* | 10/2021 | Furuta | B60G 15/00 |
| 2021/0347221 A1* | 11/2021 | Park | B60G 17/019 |
| 2021/0402841 A1* | 12/2021 | Furuta | B60G 17/0165 |
| 2022/0016949 A1 | 1/2022 | Graus et al. | |
| 2022/0105770 A1* | 4/2022 | Furuta | B60G 17/06 |
| 2022/0105771 A1* | 4/2022 | Furuta | B60G 17/018 |
| 2022/0111695 A1* | 4/2022 | Furuta | B60G 17/018 |
| 2022/0126642 A1* | 4/2022 | Furuta | G01C 21/30 |
| 2022/0144035 A1* | 5/2022 | Al Sakka | B60G 17/08 |
| 2022/0234412 A1* | 7/2022 | Tonkovich | B60G 21/106 |
| 2022/0281280 A1* | 9/2022 | Praet | B60G 17/01908 |
| 2022/0314728 A1 | 10/2022 | Borgemenke et al. | |
| 2022/0332306 A1* | 10/2022 | Noma | B62D 15/0265 |
| 2022/0380004 A1* | 12/2022 | Walker | B63B 39/00 |
| 2022/0396111 A1* | 12/2022 | Favalli | B60G 17/01908 |
| 2022/0396112 A1* | 12/2022 | Favalli | B60G 17/0157 |
| 2023/0111977 A1 | 4/2023 | Boon et al. | |
| 2023/0113819 A1 | 4/2023 | Vandersmissen et al. | |
| 2023/0114717 A1 | 4/2023 | Boon et al. | |
| 2023/0141764 A1* | 5/2023 | Pape | G07C 5/10 701/29.3 |

FOREIGN PATENT DOCUMENTS

| | | |
|---|---|---|
| AU | 5806301 A | 12/2001 |
| AU | 757592 B2 | 2/2003 |
| AU | 2003291836 A1 | 6/2004 |
| AU | 2004215923 A1 | 9/2004 |
| AU | 2005266861 A1 | 2/2006 |
| AU | 2008261186 B2 | 11/2010 |
| CN | 103807344 A | 5/2014 |
| CN | 204037280 U | 12/2014 |
| CN | 204037282 U | 12/2014 |
| CN | 102862456 B | 3/2015 |
| CN | 207059676 U | 3/2018 |
| CN | 207902078 U | 9/2018 |
| CN | 106739915 B | 8/2019 |
| CN | 110329235 B | 5/2021 |
| CN | 214057159 U | 8/2021 |
| CN | 114537072 A | 5/2022 |
| DE | 2844413 C2 | 9/1989 |
| DE | 60317928 T2 | 11/2008 |
| DE | 102008024871 A1 | 11/2009 |
| DE | 102009053758 A1 | 6/2010 |
| DE | 102009056105 A1 | 6/2010 |
| DE | 102018206462 A1 | 10/2019 |
| DE | 102020001633 A1 | 10/2020 |
| DE | 102019218699 A1 | 6/2021 |
| EP | 0419865 A1 | 4/1991 |
| EP | 1189774 A1 | 3/2002 |
| EP | 1518721 A1 | 3/2005 |
| EP | 1853442 A1 | 11/2007 |
| EP | 1970229 A1 | 9/2008 |
| EP | 1989072 A1 | 11/2008 |
| EP | 3643544 A1 | 4/2020 |
| FR | 2175848 A1 | 10/1973 |
| GB | 2344323 A | 6/2000 |
| JP | 2005 059613 A | 3/2005 |
| JP | 2005145137 A | 6/2005 |
| JP | 2018016141 A | 2/2018 |
| KR | 20140005557 A | 1/2014 |
| WO | WO-9633879 A1 | 10/1996 |
| WO | WO-2001017807 A1 | 3/2001 |
| WO | WO-2006/010226 A1 | 2/2006 |
| WO | WO-2007098559 A1 | 9/2007 |
| WO | WO-2009055841 A1 | 5/2009 |
| WO | WO-2009111826 A1 | 9/2009 |
| WO | WO-2014/152095 A1 | 9/2014 |
| WO | WO-2015055313 A1 | 4/2015 |
| WO | WO-2016072510 A1 | 5/2016 |
| WO | WO-2020185968 A1 | 9/2020 |
| WO | WO-2020214666 A1 | 10/2020 |

OTHER PUBLICATIONS

International Search Report and Written Opinion regarding International Patent Application No. PCT/US2022/046042, dated Dec. 20, 2022.

International Search Report and Written Opinion regarding International Patent Application No. PCT/US2022/046019, dated Dec. 20, 2022.

International Search Report and Written Opinion regarding International Patent Application No. PCT/US2022/046025, dated Jan. 3, 2023.

International Search Report and Written Opinion regarding International Patent Application No. PCT/US2022/046023, dated Jan. 4, 2023.

"Boyle's Law Definition & Practical Applications of Boyle's Gas Law", Apr. 24, 2019 (Apr. 24, 2019), XP093008924, Retrieved from the Internet: <URL:https://inspectapedia.com/aircond/Boyles_Gas_Law.php> [retrieved on Dec. 16, 2022] p. 1-p. 4.

International Search Report and Written Opinion regarding International Patent Application No. PCT/US2022/046027, dated Jan. 2, 2023.

International Search Report and Written Opinion regarding International Patent Application No. PCT/US2022/046037, dated Jan. 30, 2023.

International Search Report and Written Opinion regarding International Patent Application No. PCT/US2022/046038, dated Jan. 27, 2023.

International Search Report and Written Opinion regarding International Patent Application No. PCT/US2022/046053, dated Jan. 30, 2023.

International Search Report and Written Opinion regarding International Patent Application No. PCT/US2022/046033, dated Feb. 2, 2023.

International Search Report and Written Opinion regarding International Patent Application No. PCT/US2022/046048, dated Feb. 6, 2023.

International Search Report and Written Opinion regarding International Patent Application No. PCT/US2022/046021, dated Feb. 20, 2023.

* cited by examiner

SUSPENSION SYSTEM WITH ROLL AND PITCH STIFFNESS DEACTIVATION BASED ON ROAD PROFILE INFORMATION

FIELD

The present disclosure relates generally to suspension systems for motor vehicles and more particularly to suspension systems that provide active roll and pitch stiffness and roll and pitch stiffness deactivation based on road profile information.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean right or left during cornering (e.g., in turns), pitch forward under deceleration (e.g., under braking), and pitch back under acceleration. The lateral acceleration the vehicle experiences in turns causes a roll moment where the vehicle will lean/squat to the right when turning left and to the left when turning right. The fore and aft acceleration the vehicle experiences under acceleration and braking causes a pitch moment where the vehicle will lean forward loading the front axle during braking and aft, loading the rear axle, under acceleration. These roll and pitch moments decrease grip, cornering performance, and braking performance and can also be uncomfortable to the driver and passengers. Many vehicles are equipped with stabilizer bars/anti-roll bars, which are mechanical systems that help counteract the roll moments experienced during driving. For example, anti-roll bars are typically mechanical linkages that extend laterally across the width of the vehicle between the right and left dampers. When one of the dampers extends, the anti-roll bar applies a force to the opposite damper that counteracts the roll moment of the vehicle and helps to correct the roll angle to provide flatter cornering. However, there are several draw backs associated with these mechanical systems. First, there are often packaging constraints associated with mechanical systems because a stabilizer bar/anti-roll bar requires a relatively straight, unobstructed path across the vehicle between the dampers. Second, stabilizer bars/anti-roll bars are reactive and work when the suspension starts moving (i.e. leaning). Such mechanical systems cannot be easily switched off or cancelled out when roll stiffness is not needed. Some vehicles do have stabilizer bar/anti-roll bar disconnects that may be manually or electronically actuated, but the complexity and costs associated with these systems make them ill-suited for most vehicle applications. Packaging constraints also limit the ability to provide mechanical systems that effectively limit fore and aft pitch.

In an effort to augment or replace traditional mechanical stabilizer bars/anti-roll bars, anti-roll suspension systems are being developed that hydraulically connect two or more dampers in a hydraulic circuit where the extension of one damper produces a pressure change in the other damper(s) in the hydraulic circuit that makes it more difficult to compress the other damper(s) in the hydraulic circuit. This pressure change in the other damper(s) increases the roll and pitch stiffness of the suspension system of the vehicle. However, the downside of such systems is that ride comfort is more difficult to achieve because bump forces can be transmitted from one damper to another damper across the hydraulic circuit resulting in unwanted suspension movement. For example, higher levels of pitch stiffness can create ride discomfort if the vehicle is traveling down an unusually rough road or when the vehicle impacts a large pot-hole or a speed bump. Accordingly, there remains a need for improved vehicle suspension systems that can minimize pitch and roll while maintaining acceptable levels of ride comfort.

SUMMARY

This section provides a general summary of the disclosure, and is not a comprehensive disclosure of its full scope or all of its features.

In accordance with one aspect of the subject disclosure, a method of controlling a suspension system of a vehicle is provided. The method includes connecting a manifold assembly to a plurality of dampers via a plurality of hydraulic circuits. The plurality of dampers including at least one front damper and at least one rear damper. The manifold assembly includes at least one manifold comfort valve that is configured to control fluid flow between the front and rear dampers. The method further includes enabling a pitch stiffness control regime where the manifold comfort valve(s) are open and closed on demand to activate and deactivate passive pitch stiffness within the suspension system. The method includes the steps of retrieving a vehicle location, determining if the vehicle is traveling on a classified road based on the vehicle location, and retrieving the road classification information if the vehicle is traveling on a classified road. The road classification information includes a road roughness classification and the method further includes the step of determining if the road roughness classification is outside an acceptable roughness range. The method also includes the step of opening the manifold comfort valve(s) to disable the passive pitch stiffness of the suspension system for a particular time interval if the road roughness classification is outside the acceptable roughness range.

In accordance with another aspect of the subject disclosure, the method of controlling the suspension system of the vehicle, includes the step of monitoring real-time vehicle data from at least one onboard sensor. The onboard sensor(s) comprise one or more accelerometers, suspension displacement sensors, and/or road scanning sensors. The method includes the step of determining if a discrete road event is approaching based upon the real-time vehicle data or a combination of the vehicle location and a saved road event stored in memory. The method further includes the step of opening the at least one manifold comfort valve to disable the passive pitch stiffness of the suspension system for a particular time interval if a discrete road event is approaching.

In accordance with another aspect of the present disclosure, a suspension system of a vehicle is provided. The suspension system includes a plurality of dampers connected to a manifold assembly via a plurality of hydraulic circuits. The plurality of dampers includes a front left damper, a front right damper, a back left damper, and a back right damper. The manifold assembly includes a first manifold comfort valve and a second manifold comfort valve. The first manifold comfort valve can open and close to control fluid flow between the front left damper and the back left damper. Similarly, the second manifold comfort valve can open and close to control fluid flow between the front right damper and the back right damper. The suspension system further includes a GPS module programmed to retrieve a vehicle location and a suspension control unit that is arranged in electronic communication with the first and second manifold comfort valves. The suspension control unit is programmed with a pitch stiffness control regime that is configured to open and close the first and second manifold comfort valves on demand to activate and deactivate passive pitch stiffness within the suspension system. The suspension control unit is further programmed to determine if the vehicle is traveling on a classified road based on the vehicle location, retrieve a road roughness classification if the vehicle is traveling on a classified road, determine if the road roughness classification is outside an acceptable roughness range for the suspension system, and open the first and second manifold comfort valves. As such, the suspension control unit operates to disable the passive pitch stiffness of the suspension system for a particular time interval if the road roughness classification is outside the acceptable roughness range.

Advantageously, the suspension system of the present disclosure and associated control methods improve comfort by disabling the passive pitch stiffness of the suspension system if the vehicle is traveling down a rough road or if the vehicle is approaching a discrete road event like a pot-hole or speed bump, for example. This allows for more aggressive pitch stiffness to be tuned into the suspension system for improved grip, performance, handling, and braking during normal operation, since the suspension system can disable this pitch stiffness when the roughness of the road surface dictates. Because deactivation of the passive pitch stiffness of the suspension system can occur based on the road classification information and real-time vehicle data, the suspension system of the present disclosure will reduce body pitch angles during pitch events induced by inertial forces caused by driver inputs (such as during braking or acceleration) and disables/deactivates the pitch stiffness when the pitch event is caused or going to be caused by road inputs (like a pot-hole or speed bump).

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
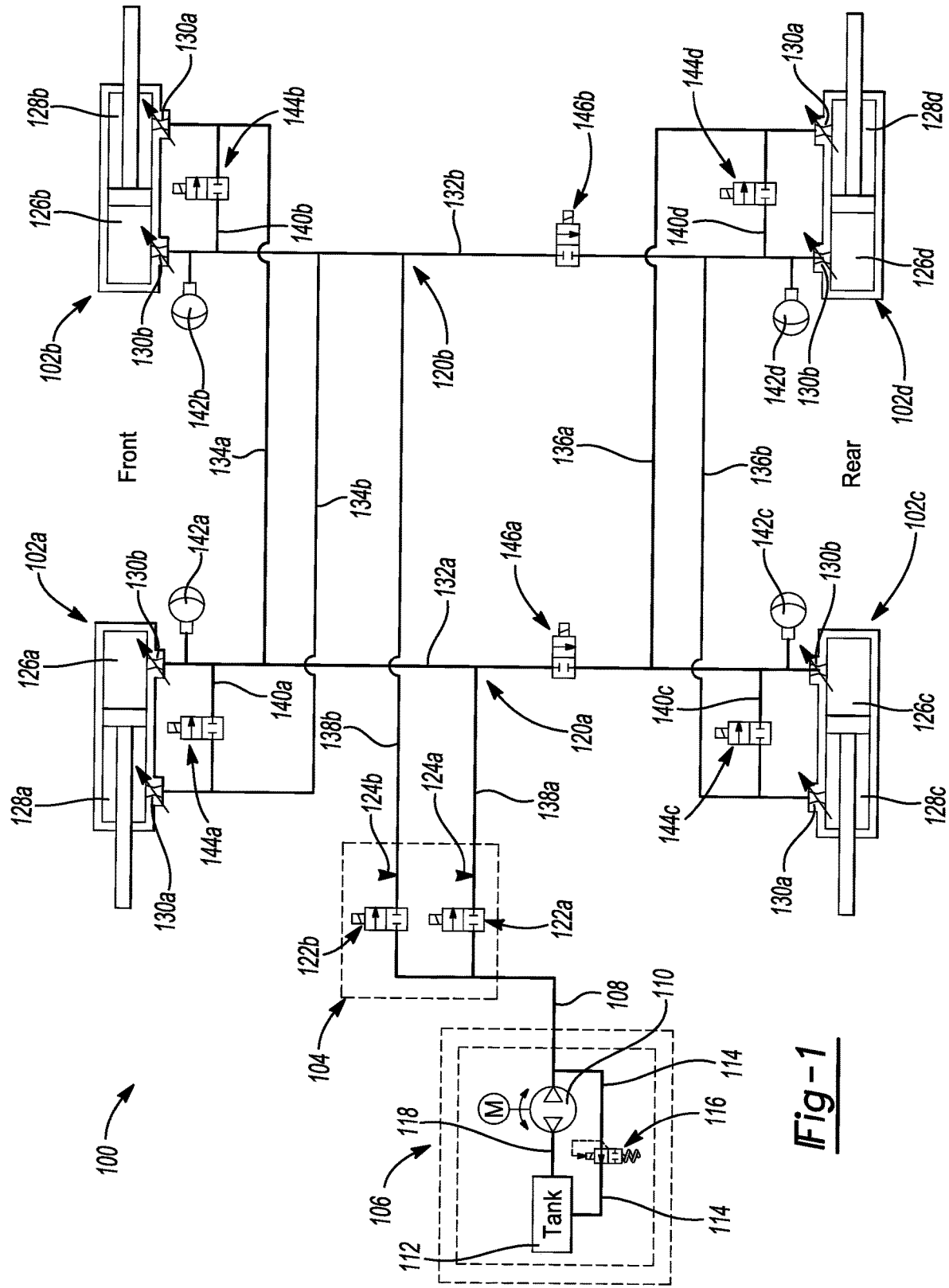
FIG. 1 is a schematic diagram illustrating an exemplary suspension system of the present disclosure that includes two comfort valves that open and close the hydraulic lines connecting the two front dampers to the two rear dampers of the system.

Referring to the Figures, wherein like numerals indicate corresponding parts throughout the several views, various comfort valve equipped suspension systems are shown.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a suspension system 100 including a front left damper 102a, a front right damper 102b, a back left damper 102c, and a back right damper 102d. While it should be appreciated that the suspension system 100 described herein may include a different number of dampers than those shown in the drawings, in most automotive applications, four dampers are used at each corner of a vehicle to control vertical movements of the front and rear wheels of the vehicle. Thus, the front left damper 102a controls (e.g., dampens) up and down (i.e., vertical) movements of the front left wheel of the vehicle, the front right damper 102b controls (e.g., dampens) up and down (i.e., vertical) movements of the front right wheel of the vehicle, the back left damper 102c controls (e.g., dampens) up and down (i.e., vertical) movements of the back left wheel of the vehicle, and the back right damper 102d controls (e.g., dampens) up and down (i.e., vertical) movements of the back right wheel of the vehicle.

The suspension system 100 also includes a manifold assembly 104 that is connected in fluid communication with a pump assembly 106 by a pump hydraulic line 108. Although other configurations are possible, in the illustrated example, the pump assembly 106 includes a bi-directional pump 110, a hydraulic reservoir 112 (e.g., a tank), and a bypass hydraulic line 114 that can be open and closed by a pressure relief valve 116. The bi-directional pump 110 includes a first inlet/outlet port that is connected to the pump hydraulic line 108 and a second inlet/outlet port that is connected in fluid communication with the hydraulic reservoir 112 by a reservoir hydraulic line 118. The bi-directional pump 110 may operate (i.e., pump fluid) in two opposite directions depending on the polarity of the electricity that is supplied to the pump 110, so the first inlet/outlet port may operate as either an inlet port or an outlet port depending on the direction the bi-directional pump 110 is operating in and the same is true for the second inlet/outlet port of the bi-directional pump 110. In the example where the first inlet/outlet port is operating as an inlet port for the bi-directional pump 110 and the second inlet/outlet port is operating as an outlet port for the bi-directional pump 110, the bi-directional pump 110 draws in hydraulic fluid from the pump hydraulic line 108 via the first inlet/outlet port and discharges hydraulic fluid into the reservoir hydraulic line 118 via the second inlet/outlet port. As such, the bi-directional pump 110 produces a negative pressure in the pump hydraulic line 108 that can be used by manifold assembly 104 to reduced fluid pressure in the suspension system 100. In the example where the second inlet/outlet port is operating as an inlet port for the bi-directional pump 110 and the first inlet/outlet port is operating as an outlet port for the bi-directional pump 110, the bi-directional pump 110 draws in hydraulic fluid from the reservoir hydraulic line 118 via the second inlet/outlet port and discharges hydraulic fluid into the pump hydraulic line 108 via the first inlet/outlet port. As such, the bi-directional pump 110 produces a positive pressure in the pump hydraulic line 108 that can be used by manifold assembly 104 to increase fluid pressure in the suspension system 100. The bypass hydraulic line 114 runs from the pump hydraulic line 108 to the hydraulic reservoir 112 and bleeds fluid back into the hydraulic reservoir 112 when the pressure in the pump hydraulic line 108 exceeds a threshold pressure that causes the pressure relief valve 116 to open.

The manifold assembly 104 is connected in fluid communication with the front and rear dampers 102a, 102b, 102c, 102d by first and second hydraulic circuits 120a, 120b. The manifold assembly 104 includes first and second manifold valves 122a, 122b that are connected in parallel with the pump hydraulic line 108. The first hydraulic circuit 120a is connected in fluid communication with the first manifold valve 122a and the second hydraulic circuit 120b is connected in fluid communication with the second manifold valve 122b. The manifold assembly 104 also includes a first pressure sensor 124a that is arranged to monitor the pressure in the first hydraulic circuit 120a and a second pressure sensor 124b that is arranged to monitor the pressure in the second hydraulic circuit 120b. The bi-directional pump 110 of the pump assembly 106 and first and second pressure sensors 124a, 124b and the first and second manifold valves 122a, 122b of the manifold assembly 104 are electrically connected to a controller (not shown), which is configured to activate (i.e., turn on in forward or reverse) the bi-directional pump 110 and electronically actuate (i.e., open and close) the first and second manifold valves 122a, 122b in response to various inputs, including signals from the first and second pressure sensors 124a, 124b. When the controller opens the first and second manifold valves 122a, 122b, the fluid pressure in the first and second hydraulic circuits 120a, 120b increases or decreases depending on which direction the bi-directional pump 110 is running in.

The anti-roll capabilities of the suspension system 100 will be explained in greater detail below; however, from FIG. 1 it should be appreciated that fluid pressure in the first and second hydraulic circuits 120a, 120b operate to dynamically adjust the roll stiffness of the vehicle and can be used to either augment or completely replace mechanical stabilizer bars/anti-roll bars. Such mechanical systems require relatively straight, unobstructed runs between each of the front dampers 102a, 102b and each of the back dampers 102c, 102d. Accordingly, the suspension system 100 disclosed herein offers packaging benefits because the dampers 102a, 102b, 102c, 102d only need to be hydraulically connected to the manifold assembly 104.

Each of the dampers 102a, 102b, 102c, 102d of the suspension system 100 includes a damper housing, a piston rod, and a piston that is mounted on the piston rod. The piston is arranged in sliding engagement with the inside of the damper housing such that the piston divides the damper housing into compression and rebound chambers. As such, the front left damper 102a includes a first compression chamber 126a and a first rebound chamber 128a, the front right damper 102b includes a second compression chamber 126b and a second rebound chamber 128b, the back left damper 102c includes a third compression chamber 126c and a third rebound chamber 128c, and the back right damper 102d includes a fourth compression chamber 126d and a fourth rebound chamber 128d.

In each damper 102a, 102b, 102c, 102d, the piston is a closed piston with no fluid flow paths defined within or by its structure. In addition, there are no other fluid flow paths in the damper housing such that no fluid is communicated between the compression and rebound chambers of the dampers 102a, 102b, 102c, 102d except through the first and second hydraulic circuits 120a, 120b. The rebound chambers 128a, 128b, 128c, 128d of the dampers 102a, 102b, 102c, 102d decrease in volume during rebound/extension strokes and increase in volume during compression strokes of the dampers 102a, 102b, 102c, 102d. The compression chambers 126a, 126b, 126c, 126d of the dampers 102a, 102b, 102c, 102d decrease in volume during compression strokes of the dampers 102a, 102b, 102c, 102d and increase in volume during rebound/extension strokes of the dampers 102a, 102b, 102c, 102d.

Each damper 102a, 102b, 102c, 102d also includes rebound and compression chamber ports 130a, 130b in the damper housing that are each provided with dampening valves. The rebound chamber port 130a is arranged in fluid communication with the rebound chamber 128a, 128b, 128c, 128d of the damper 102a, 102b, 102c, 102d and the second port 130b is arranged in fluid communication with the compression chamber 126a, 126b, 126c, 126d of the damper 102a, 102b, 102c, 102d. The dampening valves in the rebound and compression chamber ports 130a, 130b can be passive/spring-biased valves (e.g., spring-disc stacks) or active valves (e.g., electromechanical valves) and control fluid flow into and out of the compression and rebound chambers of the dampers 102a, 102b, 102c, 102d to provide one or more rebound dampening rates and compression dampening rates for each of the dampers 102a, 102b, 102c, 102d.

The first hydraulic circuit 120a includes a first longitudinal hydraulic line 132a that extends between and fluidly connects the second port 130b (to the first compression chamber 126a) of the front left damper 102a and the second port 130b (to the third compression chamber 126c) of the back left damper 102c. The first hydraulic circuit 120a includes a front hydraulic line 134a that extends between and fluidly connects the first longitudinal hydraulic line 132a and the rebound chamber port 130a (to the second rebound chamber 128b) of the front right damper 102b. The first hydraulic circuit 120a also includes a rear hydraulic line 136a that extends between and fluidly connects the first longitudinal hydraulic line 132a and the rebound chamber port 130a (to the fourth rebound chamber 128d) of the back right damper 102d. The first hydraulic circuit 120a further includes a first manifold hydraulic line 138a that extends between and fluidly connects the first longitudinal hydraulic line 132a and the first manifold valve 122a. The second hydraulic circuit 120b includes a second longitudinal hydraulic line 132b that extends between and fluidly connects the compression chamber port 130b (to the second compression chamber 126b) of the front right damper 102b and the compression chamber port 130b (to the fourth compression chamber 126d) of the back right damper 102d. The second hydraulic circuit 120b includes a front hydraulic line 134b that extends between and fluidly connects the second longitudinal hydraulic line 132b and the rebound chamber port 130a (to the first rebound chamber 128a) of the front left damper 102a. The second hydraulic circuit 120b also includes a rear hydraulic line 136b that extends between and fluidly connects the second longitudinal hydraulic line 132b and the rebound chamber port 130a (to the third rebound chamber 128c) of the back left damper 102c. The second hydraulic circuit 120b further includes a second manifold hydraulic line 138b that extends between and fluidly connects the second longitudinal hydraulic line 132b and the second manifold valve 122b. It should be appreciated that the word "longitudinal" as used in the first and second longitudinal hydraulic lines 132a, 132b simply means that the first and second longitudinal hydraulic lines 132a, 132b run between the front dampers 102a, 102b and the back dampers 102c, 102d generally. The first and second longitudinal hydraulic lines 132a, 132b need not be linear or arranged in any particular direction as long as they ultimately connect the front dampers 102a, 102b and the back dampers 102c, 102d.

The suspension system 100 also includes four bridge hydraulic lines 140a, 140b, 140c, 140d that fluidly couple the first and second hydraulic circuits 120a, 120b and each corner of the vehicle. The four bridge hydraulic lines 140a, 140b, 140c, 140d include a front left bridge hydraulic line 140a that extends between and fluidly connects the first longitudinal hydraulic line 132a of the first hydraulic circuit 120a and the front hydraulic line 134b of the second hydraulic circuit 120b, a front right bridge hydraulic line 140b that extends between and fluidly connects the front hydraulic line 134a of the first hydraulic circuit 120a and the second longitudinal hydraulic line 132b of the second hydraulic circuit 120b, a back left bridge hydraulic line 140c that extends between and fluidly connects the first longitudinal hydraulic line 132a of the first hydraulic circuit 120a and the rear hydraulic line 136b of the second hydraulic circuit 120b, and a back right bridge hydraulic line 140d that extends between and fluidly connects the rear hydraulic line 136a of the first hydraulic circuit 120a and the second longitudinal hydraulic line 132b of the second hydraulic circuit 120b.

The front left bridge hydraulic line 140a is connected to the first longitudinal hydraulic line 132a between the compression chamber port 130b of the front left damper 102a and the front hydraulic line 134a of the first hydraulic circuit 120a. The front right bridge hydraulic line 140b is connected to the second longitudinal hydraulic line 132b between the compression chamber port 130b of the front right damper 102b and the front hydraulic line 134b of the second hydraulic circuit 120b. The back left bridge hydraulic line 140c is connected to the first longitudinal hydraulic line 132a between the compression chamber port 130b of the back left damper 102c and the rear hydraulic line 136a of the first hydraulic circuit 120a. The back right bridge hydraulic line 140d is connected to the second longitudinal hydraulic line 132b between the compression chamber port 130b of the back right damper 102d and the rear hydraulic line 136b of the second hydraulic circuit 120b. In the illustrated example, the various hydraulic lines are made of flexible tubing (e.g., hydraulic hoses), but it should be appreciated that other conduit structures and/or fluid passageways can be used.

A front left accumulator 142a is arranged in fluid communication with the first longitudinal hydraulic line 132a at a location between the compression chamber port 130b of the front left damper 102a and the front left bridge hydraulic line 140a. A front right accumulator 142b is arranged in fluid communication with the second longitudinal hydraulic line 132b at a location between the compression chamber port 130b of the front right damper 102b and the front right bridge hydraulic line 140b. A back left accumulator 142c is arranged in fluid communication with the first longitudinal hydraulic line 132a at a location between the compression chamber port 130b of the back left damper 102c and the back left bridge hydraulic line 140c. A back right accumulator 142d is arranged in fluid communication with the second longitudinal hydraulic line 132b at a location between the compression chamber port 130b of the back right damper 102d and the back right bridge hydraulic line 140d. Each of the accumulators 142a, 142b, 142c, 142d have a variable fluid volume that increases and decreases depending on the fluid pressure in the first and second longitudinal hydraulic lines 132a, 132b. It should be appreciated that the accumulators 142a, 142b, 142c, 142d may be constructed in a number of different ways. For example and without limitation, the accumulators 142a, 142b, 142c, 142d may have accumulation chambers and pressurized gas chambers that are separated by floating pistons or flexible membranes.

The suspension system 100 also includes six electro-mechanical comfort valves 144a, 144b, 144c, 144d, 146a, 146b that are connected in-line (i.e., in series) with each of the bridge hydraulic lines 140a, 140b, 140c, 140d and each of the longitudinal hydraulic lines 132a, 132b. A front left comfort valve 144a is positioned in the front left bridge hydraulic line 140a. A front right comfort valve 144b is positioned in the front right bridge hydraulic line 140b. A back left comfort valve 144c is positioned in the back left bridge hydraulic line 140c. A back right comfort valve 144d is positioned in the back right bridge hydraulic line 140d. A first longitudinal comfort valve 146a is positioned in the first longitudinal hydraulic line 132a between the front and rear hydraulic lines 134a, 136a of the first hydraulic circuit 120a. A second longitudinal comfort valve 146b is positioned in the second longitudinal hydraulic line 132b between the front and rear hydraulic lines 134b, 136b of the second hydraulic circuit 120b. In the illustrated example, the comfort valves 144a, 144b, 144c, 144d and the longitudinal comfort valves 146a, 146b are semi-active electro-mechanical valves with a combination of passive spring-disk elements and a solenoid. The comfort valves 144a, 144b, 144c, 144d and the longitudinal comfort valves 146a, 146b are electronically connected to the controller, which is configured to supply electrical current to the solenoids of the comfort valves 144a, 144b, 144c, 144d and the longitudinal comfort valves 146a, 146b to selectively and individually open and close the comfort valves 144a, 144b, 144c, 144d and the longitudinal comfort valves 146a, 146b.

The first pressure sensor 124a of the manifold assembly 104 is arranged to measure fluid pressure in the first manifold hydraulic line 138a and the second pressure sensor 124b of the manifold assembly 104 is arranged to measure fluid pressure in the second manifold hydraulic line 138b. When the vehicle is cornering, braking, or accelerating, the lateral and longitudinal acceleration is measured by one or more accelerometers (not shown) and the anti-roll torque to control the roll of the vehicle is calculated by the controller. Alternatively, the lateral and longitudinal acceleration of the vehicle can be computed by the controller based on a variety of different inputs, including without limitation, steering angle, vehicle speed, brake pedal position, and/or accelerator pedal position. The dampers 102a, 102b, 102c, 102d are used to provide forces that counteract the roll moment induced by the lateral acceleration, thus reducing the roll angle of the vehicle.

When the first and second manifold valves 122a, 122b are closed, the first and second hydraulic circuits 120a, 120b operate as a closed loop system, either together or separately depending on the open or closed status of the electro-mechanical comfort valves 144a, 144b, 144c, 144d and the longitudinal comfort valves 146a, 146b. When the first and/or second manifold valves 122a, 122b are open, the bi-directional pump 110 either adds or removes fluid from the first and/or second hydraulic circuits 120a, 120b. As will be explained in greater detail below, the suspension system 100 can control the roll stiffness of the vehicle, which changes the degree to which the vehicle will lean to one side or the other during corning (i.e., roll)

For example, when the vehicle is put into a right-hand turn, the momentum of the sprung weight of the vehicle tends to make the vehicle lean left towards the outside of the turn, compressing the front left damper 102a and the back left damper 102c. When this occurs, fluid flows out from the first compression chamber 126a of the front left damper 102a and the third compression chamber 126c of the back left damper 102c into the first longitudinal hydraulic line 132a of the first hydraulic circuit 120a. As a result of the weight transfer to the left side of the vehicle, the front right damper 102b and back right damper 102d begin to extend, causing fluid to flow out of the second rebound chamber 128b of the front right damper 102b and the fourth compression chamber 126d of the back right damper 102d into the front and rear hydraulic lines 134a, 136a of the first hydraulic circuit 120a. When the comfort valves 144a, 144b, 144c, 144d are closed, the fluid flow out of the first compression chamber 126a of the front left damper 102a, out of the third compression chamber 126c of the back left damper 102c, out of the second rebound chamber 128b of the front right damper 102b, and out of the fourth rebound chamber 128d of the back right damper 102d and into the front and rear hydraulic lines 134a, 136a of the first hydraulic circuit 120a increases the pressure in the front left and back left accumulators 142a, 142c, thus providing a passive roll resistance where it becomes increasingly more difficult to compress the front left damper 102a and the back left damper 102c since the first compression chamber 126a of the front left damper 102a and the third compression chamber 126c of the back left damper 102c are connected in fluid communication with the first hydraulic circuit 120a. At the same time, fluid flows out of front right and back right accumulators 142b, 142d and into the first rebound chamber 128a of the front left damper 102a, into the third rebound chamber 128c of the back left damper 102c, into the second compression chamber 126b of the front right damper 102b, and into the fourth compression chamber 126d of the back right damper 102d. The resulting pressure difference between the dampers 102a, 102b, 102c, 102d generates damper forces that counteract or resist the roll moment of the vehicle. Additional roll resistance can be added by opening the first manifold valve 122a as the bi-directional pump 110 is running in a first direction where the bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the first hydraulic circuit 120a when the first manifold valve 122a is open.

The opposite is true when the vehicle is put into a left-hand turn, where the momentum of the sprung weight of the vehicle tends to make the vehicle lean right towards the outside of the turn, compressing the front right damper 102b and the back right damper 102d. When this occurs, fluid flows out from the second compression chamber 126b of the front right damper 102b and the fourth compression chamber 126d of the back right damper 102d into the second longitudinal hydraulic line 132b of the second hydraulic circuit 120b. As a result of the weight transfer to the right side of the vehicle, the front left damper 102a and back left damper 102c begin to extend, causing fluid to flow out of the first rebound chamber 128a of the front left damper 102a and the third rebound chamber 128c of the back left damper 102c into the front and rear hydraulic lines 134b, 136b of the second hydraulic circuit 120b. When the comfort valves 144a, 144b, 144c, 144d are closed, the fluid flow out of the second compression chamber 126b of the front right damper 102b, out of the fourth compression chamber 126d of the back right damper 102d, out of the first rebound chamber 128a of the front left damper 102a, and out of the third rebound chamber 128c of the back left damper 102c and into the front and rear hydraulic lines 134b, 136b of the second hydraulic circuit 120b increases the pressure in the front right and back right accumulators 142b, 142d, thus providing a passive roll resistance where it becomes increasingly more difficult to compress the front right damper 102b and the back right damper 102d since the second compression chamber 126b of the front right damper 102b and the fourth compression chamber 126d of the back right damper 102d are connected in fluid communication with the second hydraulic circuit 120b. At the same time, fluid flows out of front left and back left accumulators 142a, 142c and into the second rebound chamber 128b of the front right damper 102b, into the fourth rebound chamber 128d of the back right damper 102d, into the first compression chamber 126a of the front left damper 102a, and into the third compression chamber 126c of the back left damper 102c. The resulting pressure difference between the dampers 102a, 102b, 102c, 102d generates damper forces that counteract or resist the roll moment of the vehicle. Additional roll resistance can be added by opening the second manifold valve 122b as the bi-directional pump 110 is running in the first direction where the bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the second hydraulic circuit 120b when the second manifold valve 122b is open.

It should also be appreciated that during cornering, the roll stiffness of the front dampers 102a, 102b can be coupled or de-coupled from the roll stiffness of the rear dampers 102c, 102d by opening and closing the first and/or second longitudinal comfort valves 146a, 146b. For example, the roll stiffness of the front left damper 102a and the back left damper 102c will be coupled when the first longitudinal comfort valve 146a is open and decoupled when the first longitudinal comfort valve 146a is closed. Similarly, the roll stiffness of the front right damper 102b and the back right damper 102d will be coupled when the second longitudinal comfort valve 146b is open and decoupled when the second longitudinal comfort valve 146b is closed.

When roll stiffness is not required, the comfort valves 144a, 144b, 144c, 144d and the longitudinal comfort valves 146a, 146b can be opened to enhance the ride comfort of the suspension system 100 and reduce or eliminate unwanted suspension movements resulting from the hydraulic coupling of one damper of the system to another damper of the system (e.g., where the compression of one damper causes movement and/or a dampening change in another damper). For example, when the front left comfort valve 144a is open and the front left damper 102a undergoes a compression stroke as the front left wheel hits a bump, fluid may flow from the first compression chamber 126a of the front left damper 102a, into the first longitudinal hydraulic line 132a, from the first longitudinal hydraulic line 132a to the front hydraulic line 134b of the second hydraulic circuit 120b by passing through the front left bridge hydraulic line 140a and the front left comfort valve 144a, and into the first rebound chamber 128a of the front left damper 102a. Thus, fluid can travel from the first compression chamber 126a to the first rebound chamber 128a of the front left damper 102a with the only restriction coming from the dampening valves in the rebound and compression chamber ports 130a, 130b of the front left damper 102a. As such, when all of the comfort valves 144a, 144b, 144c, 144d and the longitudinal comfort valves 146a, 146b are open, the dampers 102a, 102b, 102c, 102d are effectively decoupled from one another for improved ride comfort. It should also be appreciated that to return the suspension system 100 to this "comfort mode" of operation, the first and/or second manifold valves 122a, 122b may be opened while the bi-directional pump 110 is running in a second direction where the bi-directional pump 110 draws in hydraulic fluid from the pump hydraulic line 108 and discharges hydraulic fluid into the reservoir hydraulic line 118 to produce a negative pressure in the pump hydraulic line 108 that reduces fluid pressure in the first and/or second hydraulic circuits 120a, 120b.

Figure 2:
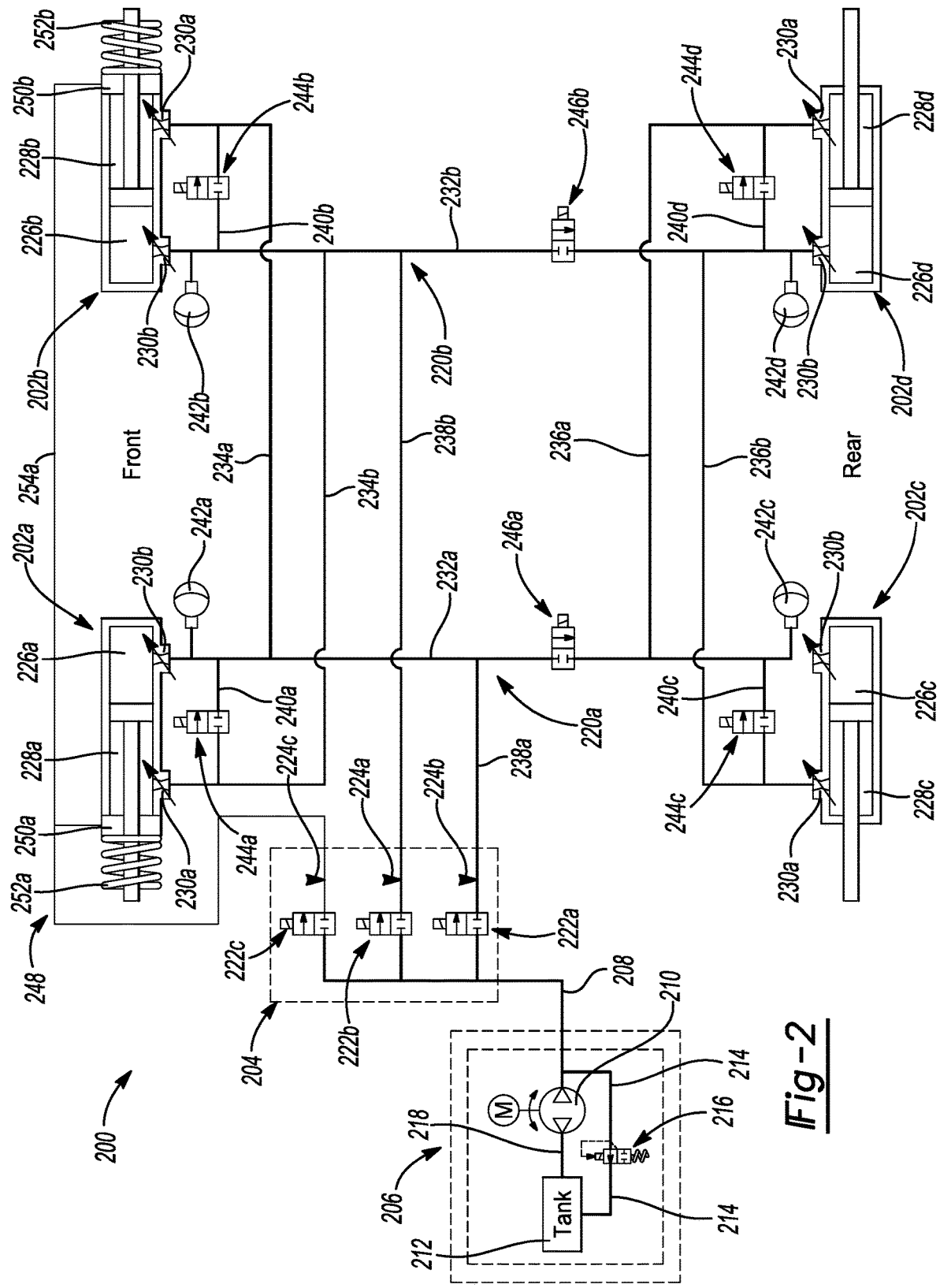
FIG. 2 is a schematic diagram illustrating another exemplary suspension system of the present disclosure that includes two comfort valves that open and close the hydraulic lines connecting the two front dampers to the two rear dampers of the system and a separate hydraulic lifting circuit for the two front dampers.

FIG. 2 illustrates another suspension system 200 that shares many of the same components as the suspension system 100 illustrated in FIG. 1, but in FIG. 2 a front axle lift assembly 248 has been added. Rather than repeat the description set forth above, the following paragraphs describe the structure and function of the components in FIG. 2 that are new and/or different from those shown and described in connection with FIG. 1. It should be appreciated that the reference numbers in FIG. 1 are "100" series numbers (e.g., 100, 102, 104, etc.) whereas the components in FIG. 2 that are the same or similar to the components of the suspension system 100 shown in FIG. 1 share the same base reference numbers, but are listed as "200" series numbers (e.g., 200, 202, 204, etc.). Thus, the same description for element 100 above applies to element 200 in FIG. 2 and so on and so forth.

The front axle lift assembly 248 illustrated in FIG. 2 includes a front left lifter 250a on the front left damper 202a and a front right lifter 250b on the front right damper 202b. Although other configurations are possible, in the illustrated example, the front left damper 202a and the front right damper 202b include a front left coil spring 252a and a front right coil spring 252b, respectively, that extend co-axially and helically about the piston rods of the front dampers 202a, 202b in a coil-over arrangement. The front lifters 250a, 250b are positioned between the front coils springs 252a, 252b and the first and second rebound chambers 228a, 228b of the front dampers 202a, 202b and extend co-axially and annularly about the piston rods. The manifold assembly 204 further includes a third manifold valve 222c that is connected in fluid communication with the pump hydraulic line 208. A front axle lift hydraulic line 254a extends between and is fluidly connected to the third manifold valve 222c with the front left lifter 250a and the front right lifter 250b. A third pressure sensor 224c is arranged to monitor the fluid pressure in the front axle lift hydraulic line 254a. Each front lifter 250a, 250b is axially expandable such that an increase in fluid pressure inside the front lifters 250a, 250b causes the front lifters 250a, 250b to urge the front coil springs 252a, 252b away from the first and second rebound chambers 228a, 228b of the front dampers 202a, 202b, which operates to lift (i.e., raise) the front of the vehicle, increasing the ride height. To activate the front axle lift assembly 248, the controller opens the third manifold valve 222c when the bi-directional pump 210 is running in the first direction where the bi-directional pump 210 draws in hydraulic fluid from the reservoir hydraulic line 218 and discharges hydraulic fluid into the pump hydraulic line 208 to produce a positive pressure in the pump hydraulic line 208, which increases fluid pressure in the front axle lift hydraulic line 254a and thus the front lifters 250a, 250b. Once a desired lift position is achieved, the controller closes the third manifold valve 222c. It should therefore be appreciated that the front axle lift assembly 248 can be used to provide improved ground clearance during off-road operation or to give low riding vehicles improved ground clearance when traversing speed bumps. To deactivate the front axle lift assembly 248, the controller opens the third manifold valve 222c when the bi-directional pump 210 is running in the second direction where the bi-directional pump 210 draws in hydraulic fluid from the pump hydraulic line 208 and discharges hydraulic fluid into the reservoir hydraulic line 218 to produce a negative pressure in the pump hydraulic line 208 that reduces fluid pressure in the front axle lift hydraulic line 254a to lower the front of the vehicle back down to an unlifted position.

Figure 3:
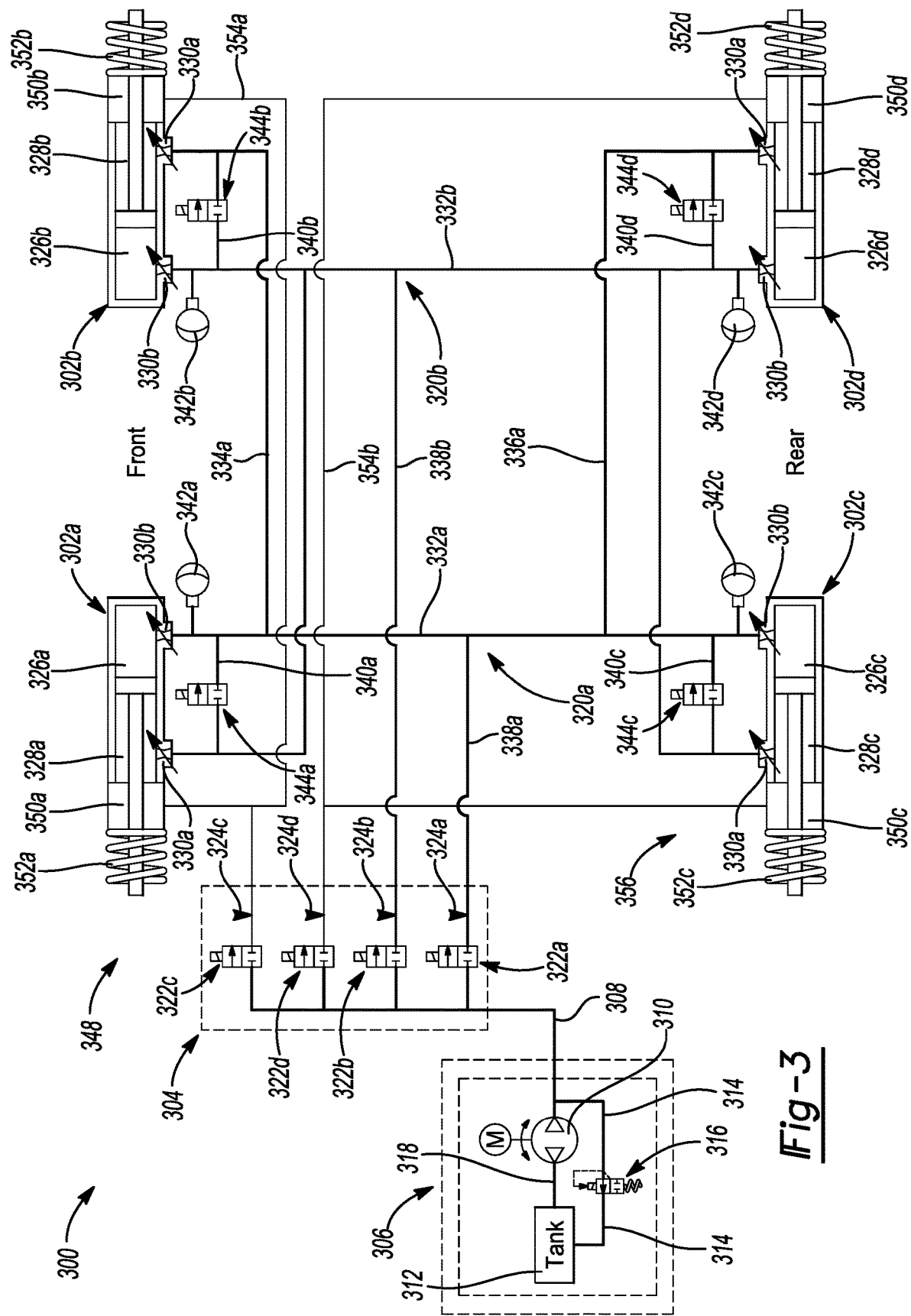
FIG. 3 is a schematic diagram illustrating another exemplary suspension system of the present disclosure that includes two comfort valves that open and close the hydraulic lines connecting the two front dampers to the two rear dampers of the system and two separate hydraulic lifting circuits for the two front dampers and the two rear dampers.

FIG. 3 illustrates another suspension system 300 that shares many of the same components as the suspension systems 100, 200 illustrated in FIGS. 1 and 2, but in FIG. 3 a rear axle lift assembly 356 has been added. Rather than repeat the description set forth above, the following paragraphs describe the structure and function of the components in FIG. 3 that are new and/or different from those shown and described in connection with FIGS. 1 and 2. It should be appreciated that the reference numbers in FIG. 1 are "100" series numbers (e.g., 100, 102, 104, etc.) and the reference numbers in FIG. 2 are "200" series numbers (e.g., 200, 202, 204, etc.) whereas the components in FIG. 3 that are the same or similar to the components of the suspension systems 100, 200 shown in FIGS. 1 and 2 share the same base reference numbers, but are listed as "300" series numbers (e.g., 300, 302, 304, etc.). Thus, the same description for elements 100 and 200 above applies to element 300 in FIG. 3 and so on and so forth.

The rear axle lift assembly 356 illustrated in FIG. 3 includes a back left lifter 350c on the back left damper 302c and a back right lifter 350d on the back right damper 302d. Although other configurations are possible, in the illustrated example, the back left damper 302c and the back right damper 302d include a back left coil spring 352c and a back right coil spring 352d, respectively, that extend co-axially and helically about the piston rods of the back dampers 302c, 302d in a coil-over arrangement. The back lifters 350c, 350d are positioned between the back coils springs 352c, 352d and the third and fourth rebound chambers 328c, 328d of the back dampers 302a, 302b and extend co-axially and annularly about the piston rods. The manifold assembly 304 further includes a fourth manifold valve 322d that is connected in fluid communication with the pump hydraulic line 308. A rear axle lift hydraulic line 354b extends between and is fluidly connected to the fourth manifold valve 322d with the back left lifter 350c and the back right lifter 350d. A fourth pressure sensor 324d is arranged to monitor the fluid pressure in the rear axle lift hydraulic line 354b. Each back lifter 350c, 350d is axially expandable such that an increase in fluid pressure inside the back lifters 350c, 350d causes the back lifters 350c, 350d to urge the back coil springs 352c, 352d away from the third and fourth rebound chambers 328c, 328d of the back dampers 302c, 302d, which operates to lift (i.e., raise) the back/rear of the vehicle, increasing the ride height. To activate the rear axle lift assembly 356, the controller opens the fourth manifold valve 322d when the bi-directional pump 310 is running in the first direction where the bi-directional pump 310 draws in hydraulic fluid from the reservoir hydraulic line 318 and discharges hydraulic fluid into the pump hydraulic line 308 to produce a positive pressure in the pump hydraulic line 308, which increases fluid pressure in the rear axle lift hydraulic line 354b and thus the back lifters 350c, 350d. Once a desired lift position is achieved, the controller closes the fourth manifold valve 322d. It should therefore be appreciated that the rear axle lift assembly 356 can be used in combination with the front axle lift assembly 348 (also described above in connection with FIG. 2) to provide improved ground clearance during off-road operation or to give low riding vehicles improved ground clearance when traversing speed bumps. To deactivate the rear axle lift assembly 356, the controller opens the fourth manifold valve 322D when the bi-directional pump 310 is running in the second direction where the bi-directional pump 310 draws in hydraulic fluid from the pump hydraulic line 308 and discharges hydraulic fluid into the reservoir hydraulic line 318 to produces a negative pressure in the pump hydraulic line 308 that reduces fluid pressure in the rear axle lift hydraulic line 354b to lower the rear of the vehicle back down to an unlifted position.

Figure 4:
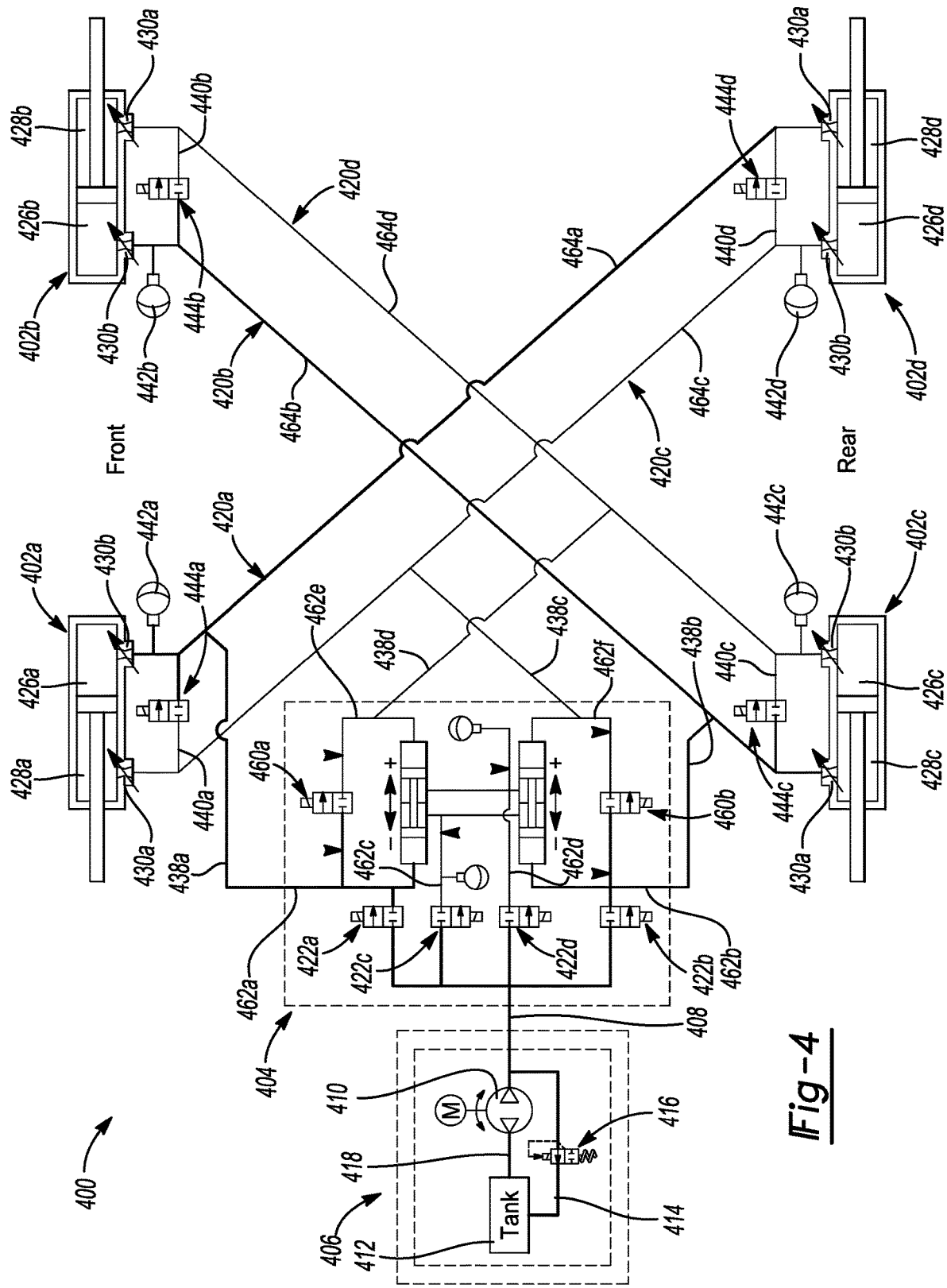
FIG. 4 is a schematic diagram illustrating another exemplary suspension system of the present disclosure that includes four hydraulic circuits connecting the front and rear dampers and an exemplary comfort valve equipped manifold assembly.

With reference to FIG. 4, another suspension system 400 is illustrated that shares many of the same components as the suspension system 100 illustrated in FIG. 1. Rather than repeat the description set forth above, the following paragraphs describe the structure and function of the components in FIG. 4 that are new and/or different from those shown and described in connection with FIG. 1. It should be appreciated that the reference numbers in FIG. 1 are "100" series numbers (e.g., 100, 102, 104, etc.) whereas the components in FIG. 4 that are the same or similar to the components of the suspension system 100 shown in FIG. 1 share the same base reference numbers, but are listed as "400" series numbers (e.g., 400, 402, 404, etc.). Thus, the same description for element 100 above applies to element 400 in FIG. 4 and so on and so forth.

The suspension system 400 in FIG. 4 also includes a front left damper 402a, a front right damper 402b, a back left damper 402c, and a back right damper 402d. The suspension system 400 also includes a manifold assembly 404 that is connected in fluid communication with a pump assembly 406 by a pump hydraulic line 408. Like in FIG. 1, the pump assembly 406 includes a bi-directional pump 410, a hydraulic reservoir 412 (e.g., a tank), and a bypass hydraulic line 414 that can be open and closed by a pressure relief valve 416.

The manifold assembly 404 is connected in fluid communication with the front and rear dampers 402a, 402b, 402c, 402d by four hydraulic circuits 420a, 420b, 420c, 420d: a first hydraulic circuit 420a, a second hydraulic circuit 420*b*, a third hydraulic circuit 420*c*, and a fourth hydraulic circuit 420*d*. The manifold assembly 404 includes four manifold valves 422*a*, 422*b*, 422*c*, 422*d* (a first manifold valve 422*a*, a second manifold valve 422*b*, a third manifold valve 422*c*, and a fourth manifold valve 422*d*) that are connected in parallel with the pump hydraulic line 408. The manifold assembly 404 further includes a first manifold comfort valve 460*a*, a second manifold comfort valve 460*b*, and six manifold conduits 462*a*, 462*b*, 462*c*, 462*d*, 462*e*, 462*f*: a first manifold conduit 462*a*, a second manifold conduit 462*b*, a third manifold conduit 462*c*, a fourth manifold conduit 462*d*, a fifth manifold conduit 462*e*, and a sixth manifold conduit 462*f*. The first manifold conduit 462*a* is connected in fluid communication with the first manifold valve 422*a* and the first manifold comfort valve 460*a* while the second manifold conduit 462*b* is connected in fluid communication with the second manifold valve 422*b* and the second manifold comfort valve 460*b*. The third manifold conduit 462*c* is connected in fluid communication with the third manifold valve 422*c* and the fourth manifold conduit 462*d* is connected in fluid communication with the fourth manifold valve 422*d*. The fifth manifold conduit 462*e* is connected in fluid communication with the first manifold comfort valve 460*a* and the sixth manifold conduit 462*f* is connected in fluid communication with the second manifold comfort valve 460*b*. Additional structure and operational details of the manifold assembly 404 is described below in connection with FIG. 5; however, it should be appreciated from FIG. 4 that fluid pressure in the four hydraulic circuits 420*a*, 420*b*, 420*c*, 420*d* operates to dynamically adjust the roll and pitch stiffness of the vehicle and can be used to either augment or completely replace mechanical stabilizer bars/anti-roll bars. Such mechanical systems require relatively straight, unobstructed runs between each of the front dampers 402*a*, 402*b* and each of the back dampers 402*c*, 402*d*. Accordingly, the suspension system 400 disclosed herein offers packaging benefits because the dampers 402*a*, 402*b*, 402*c*, 402*d* only need to be hydraulically connected to the manifold assembly 404.

The first hydraulic circuit 420*a* includes a first cross-over hydraulic line 464*a* that extends between and fluidly connects the compression chamber port 430*b* (to the first compression chamber 426*a*) of the front left damper 402*a* and the rebound chamber port 430*a* (to the fourth rebound chamber 428*d*) of the back right damper 402*d*. The first hydraulic circuit 420*a* also includes a first manifold hydraulic line 438*a* that extends between and fluidly connects the first cross-over hydraulic line 464*a* and the first manifold conduit 462*a*. The second hydraulic circuit 420*b* includes a second cross-over hydraulic line 464*b* that extends between and fluidly connects the compression chamber port 430*b* (to the second compression chamber 426*b*) of the front right damper 402*b* and the rebound chamber port 430*a* (to the third rebound chamber 428*c*) of the back left damper 402*c*. The second hydraulic circuit 420*b* also includes a second manifold hydraulic line 438*b* that extends between and fluidly connects the second cross-over hydraulic line 464*b* and the second manifold conduit 462*b*. The third hydraulic circuit 420*c* includes a third cross-over hydraulic line 464*c* that extends between and fluidly connects the rebound chamber port 430*a* (to the first rebound chamber 428*a*) of the front left damper 402*a* and the compression chamber port 430*b* (to the fourth compression chamber 426*d*) of the back right damper 402*d*. The third hydraulic circuit 420*c* also includes a third manifold hydraulic line 438*c* that extends between and fluidly connects the third cross-over hydraulic line 464*c* and the sixth manifold conduit 462*f*. The fourth hydraulic circuit 420*d* includes a fourth cross-over hydraulic line 464*d* that extends between and fluidly connects the rebound chamber port 430*a* (to the second rebound chamber 428*b*) of the front right damper 402*b* and the compression chamber port 430*b* (to the third compression chamber 426*c*) of the back left damper 402*c*. The fourth hydraulic circuit 420*d* also includes a fourth manifold hydraulic line 438*d* that extends between and fluidly connects the fourth cross-over hydraulic line 464*d* and the fifth manifold conduit 462*e*. It should be appreciated that the word "cross-over" as used in the first, second, third, and fourth cross-over hydraulic lines 464*a*, 464*b*, 464*c*, 464*d* simply means that the first, second, third, and fourth cross-over hydraulic lines 464*a*, 464*b*, 464*c*, 464*d* run between dampers 402*a*, 402*b*, 402*c*, 402*d* at opposite corners of the vehicle (e.g., front left to back right and front right to back left). The first, second, third, and fourth cross-over hydraulic lines 464*a*, 464*b*, 464*c*, 464*d* need not be linear or arranged in any particular direction as long as they ultimately connect dampers 402*a*, 402*b*, 402*c*, 402*d* positioned at opposite corners of the vehicle.

The suspension system 400 also includes four bridge hydraulic lines 440*a*, 440*b*, 440*c*, 440*d* that fluidly couple the first and third hydraulic circuits 420*a*, 420*c* and the second and fourth hydraulic circuits 420*b*, 420*d* to one another. The four bridge hydraulic lines 440*a*, 440*b*, 440*c*, 440*d* include a front left bridge hydraulic line 440*a* that extends between and fluidly connects the first cross-over hydraulic line 464*a* and the third cross-over hydraulic line 464*c*, a front right bridge hydraulic line 440*b* that extends between and fluidly connects the second cross-over hydraulic line 464*b* and the fourth cross-over hydraulic line 464*d*, a back left bridge hydraulic line 440*c* that extends between and fluidly connects the second cross-over hydraulic line 464*b* and the fourth cross-over hydraulic line 464*d*, and a back right bridge hydraulic line 440*d* that extends between and fluidly connects the first cross-over hydraulic line 464*a* and the third cross-over hydraulic line 464*c*.

The front left bridge hydraulic line 440*a* is connected to the first cross-over hydraulic line 464*a* between the compression chamber port 430*b* of the front left damper 402*a* and the first manifold hydraulic line 438*a* and is connected to the third cross-over hydraulic line 464*c* between the rebound chamber port 430*a* of the front left damper 402*a* and the third manifold hydraulic line 438*c*. The front right bridge hydraulic line 440*b* is connected to the second cross-over hydraulic line 464*b* between the compression chamber port 430*b* of the front right damper 402*b* and the second manifold hydraulic line 438*b* and is connected to the fourth cross-over hydraulic line 464*d* between the rebound chamber port 430*a* of the front right damper 402*b* and the fourth manifold hydraulic line 438*d*. The back left bridge hydraulic line 440*c* is connected to the second cross-over hydraulic line 464*b* between the rebound chamber port 430*a* of the back left damper 402*c* and the second manifold hydraulic line 438*b* and is connected to the fourth cross-over hydraulic line 464*d* between the compression chamber port 430*b* of the back left damper 402*c* and the fourth manifold hydraulic line 438*d*. The back right bridge hydraulic line 440*d* is connected to the first cross-over hydraulic line 464*a* between the rebound chamber port 430*a* of the back right damper 402*d* and the first manifold hydraulic line 438*a* and is connected to the third cross-over hydraulic line 464*c* between the compression chamber port 430*b* of the back right damper 402*d* and the third manifold hydraulic line 438*c*. In the illustrated example, the various hydraulic lines are made of flexible tubing (e.g., hydraulic hoses), but it should be appreciated that other conduit structures and/or fluid passageways can be used.

A front left accumulator 442a is arranged in fluid communication with the first cross-over hydraulic line 464a at a location between the compression chamber port 430b of the front left damper 402a and the front left bridge hydraulic line 440a. A front right accumulator 442b is arranged in fluid communication with the second cross-over hydraulic line 464b at a location between the compression chamber port 430b of the front right damper 402b and the front right bridge hydraulic line 440b. A back left accumulator 442c is arranged in fluid communication with the fourth cross-over hydraulic line 464d at a location between the compression chamber port 430b of the back left damper 402c and the back left bridge hydraulic circuit 420c. A back right accumulator 442d is arranged in fluid communication with the third cross-over hydraulic line 464c at a location between the compression chamber port 430b of the back right damper 402d and the back right bridge hydraulic line 440d. Each of the accumulators 442a, 442b, 442c, 442d have a variable fluid volume that increases and decreases depending on the fluid pressure in the first and second longitudinal hydraulic lines 432a, 432b. It should be appreciated that the accumulators 442a, 442b, 442c, 442d may be constructed in a number of different ways. For example and without limitation, the accumulators 442a, 442b, 442c, 442d may have accumulation chambers and pressurized gas chambers that are separated by floating pistons or flexible membranes.

The suspension system 400 also includes four electro-mechanical comfort valves 444a, 444b, 444c, 444d that are connected in-line (i.e., in series) with each of the bridge hydraulic lines 440a, 440b, 440c, 440d. A front left comfort valve 444a is positioned in the front left bridge hydraulic line 440a. A front right comfort valve 444b is positioned in the front right bridge hydraulic line 440b. A back left comfort valve 444c is positioned in the back left bridge hydraulic line 440c. A back right comfort valve 444d is positioned in the back right bridge hydraulic line 440d. In the illustrated example, the four comfort valves 444a, 444b, 444c, 444d and the two manifold comfort valves 460a, 460b are semi-active electro-mechanical valves with a combination of passive spring-disk elements and a solenoid. The comfort valves 444a, 444b, 444c, 444d and the two manifold comfort valves 460a, 460b are electronically connected to the controller, which is configured to supply electrical current to the solenoids of the comfort valves 444a, 444b, 444c, 444d and the two manifold comfort valves 460a, 460b to selectively and individually open and close the comfort valves 444a, 444b, 444c, 444d and the two manifold comfort valves 460a, 460b.

When the manifold valves 422a, 422b, 422c, 422d are closed, the hydraulic circuits 420a, 420b, 420c, 420d operate as a closed loop system, either together or separately depending on the open or closed status of the comfort valves 444a, 444b, 444c, 444d and manifold comfort valves 460a, 460b. When the manifold valves 422a, 422b, 422c, 422d are open, the bi-directional pump 110 either adds or removes fluid from one or more of the hydraulic circuits 420a, 420b, 420c, 420d. There are three primary types of suspension movements that the illustrated suspension system 400 can control either passively (i.e., as a closed loop system) or actively (i.e., as an open loop system) by changing or adapting the roll and/or pitch stiffness of the vehicle: leaning to one side or the other during cornering (i.e., roll) pitching forward during braking (i.e., brake dive), and pitching aft during acceleration (i.e., rear end squat). Descriptions of how the suspension system 400 reacts to each of these conditions are provided below.

When the vehicle is put into a right-hand turn, the momentum of the sprung weight of the vehicle tends to make the vehicle lean left towards the outside of the turn, compressing the front left damper 402a and the back left damper 402c. When this occurs, fluid flows out from the first compression chamber 426a of the front left damper 402a and the third compression chamber 426c of the back left damper 402c into the first and fourth cross-over hydraulic lines 464a, 464d. As a result of the weight transfer to the left side of the vehicle, the front right damper 402b and back right damper 402d begin to extend, causing fluid to flow out of the second rebound chamber 428b of the front right damper 402b and the fourth rebound chamber 428d of the back right damper 402d into the first and fourth cross-over hydraulic lines 464a, 464d. When the comfort valves 444a, 444b, 444c, 444d are closed, the fluid flow out of the first compression chamber 426a of the front left damper 402a, out of the third compression chamber 426c of the back left damper 402c, out of the second rebound chamber 428b of the front right damper 402b, and out of the fourth rebound chamber 428d of the back right damper 402d and into the first and fourth cross-over hydraulic lines 464a, 464d increases the pressure in the front left and back left accumulators 442a, 442c, thus providing a passive roll resistance where it becomes increasingly more difficult to compress the front left damper 402a and the back left damper 402c since the first compression chamber 426a of the front left damper 402a and the third compression chamber 426c of the back left damper 402c are connected in fluid communication with the first and fourth hydraulic circuits 420a, 420d. At the same time, fluid flows out of front right and back right accumulators 442b, 442d and into the first rebound chamber 428a of the front left damper 402a, into the third rebound chamber 428c of the back left damper 402c, into the second compression chamber 426b of the front right damper 402b, and into the fourth compression chamber 426d of the back right damper 402d. The resulting pressure difference between the dampers 402a, 402b, 402c, 402d generates damper forces that counteract or resist the roll moment of the vehicle. Additional roll resistance can be added by opening the first manifold valve 422a and the first manifold comfort valve 460a as the bi-directional pump 410 is running in a first direction where the bi-directional pump 410 draws in hydraulic fluid from the reservoir hydraulic line 418 and discharges hydraulic fluid into the pump hydraulic line 408 to produce a positive pressure in the pump hydraulic line 408, which increases fluid pressure in the first and fourth hydraulic circuits 420a, 420d.

The opposite is true when the vehicle is put into a left-hand turn, where the momentum of the sprung weight of the vehicle tends to make the vehicle lean right towards the outside of the turn, compressing the front right damper 402b and the back right damper 402d. When this occurs, fluid flows out from the second compression chamber 426b of the front right damper 402b and the fourth compression chamber 426d of the back right damper 402d into the second and third cross-over hydraulic lines 464b, 464c. As a result of the weight transfer to the right side of the vehicle, the front left damper 402a and back left damper 402c begin to extend, causing fluid to flow out of the first rebound chamber 428a of the front left damper 402a and the third rebound chamber 428c of the back left damper 402c into the second and third cross-over hydraulic lines 464b, 464c. When the comfort valves 444a, 444b, 444c, 444d are closed, the fluid flow out of the second compression chamber 426b of the front right damper 402b, out of the fourth compression chamber 426d of the back right damper 402d, out of the first rebound chamber 428a of the front left damper 402a, and out of the third rebound chamber 428c of the back left damper 402c and into the second and third cross-over hydraulic lines 464b, 464c increases the pressure in the front right and back right accumulators 142b, 142d, thus providing a passive roll resistance where it becomes increasingly more difficult to compress the front right damper 402b and the back right damper 402d since the second compression chamber 426b of the front right damper 402b and the fourth compression chamber 426d of the back right damper 402d are connected in fluid communication with the second and third hydraulic circuits 420b, 420c. At the same time, fluid flows out of front left and back left accumulators 442a, 442c and into the second rebound chamber 428b of the front right damper 402b, into the fourth rebound chamber 428d of the back right damper 402d, into the first compression chamber 426a of the front left damper 402a, and into the third compression chamber 426c of the back left damper 402c. The resulting pressure difference between the dampers 402a, 402b, 402c, 402d generates damper forces that counteract or resist the roll moment of the vehicle. Additional roll resistance can be added by opening the second manifold valve 422b and the second manifold comfort valve 460b as the bi-directional pump 410 is running in the first direction where the bi-directional pump 410 draws in hydraulic fluid from the reservoir hydraulic line 418 and discharges hydraulic fluid into the pump hydraulic line 408 to produce a positive pressure in the pump hydraulic line 408, which increases fluid pressure in the second and third hydraulic circuits 420b, 420c.

During braking, the momentum of the sprung weight of the vehicle tends to make the vehicle pitch or dive forward, compressing the front left damper 402a and the front right damper 402b. When this occurs, fluid flows out from the first compression chamber 426a of the front left damper 402a into the first cross-over hydraulic line 464a and out from the second compression chamber 426b of the front right damper 402b into the second cross-over hydraulic line 464b. As a result of the weight transfer to the front of the vehicle, the back left damper 402c and back right damper 402d begin to extend, causing fluid to flow out of the third rebound chamber 428c of the back left damper 402c into the second cross-over hydraulic line 464b and out of the fourth rebound chamber 428d of the back right damper 402d into the first cross-over hydraulic line 464a. With the front left, front right, back left, and back right comfort valves 444a, 444b, 444c, 444d and the first and second manifold comfort valves 460a, 460b all closed, the fluid flow out of the third rebound chamber 428c of the back left damper 402c and the fourth rebound chamber 428d of the back right damper 402d into the first and second cross-over hydraulic lines 464a, 464b increases the pressure in the front left and front right accumulators 442a, 442b, thus providing a passive pitch resistance where it becomes increasingly more difficult to compress the front left damper 402a and the front right damper 402b since the first compression chamber 426a of the front left damper 402a and the second compression chamber 426b of the front right damper 402b are connected in fluid communication with the first and second hydraulic circuits 420a, 420b.

During acceleration, the momentum of the sprung weight of the vehicle tends to make the vehicle pitch or squat rearward (i.e., aft), compressing the back left damper 402c and the back right damper 402d. When this occurs, fluid flows out from the third compression chamber 426c of the back left damper 402c into the fourth cross-over hydraulic line 464d and out of the fourth compression chamber 426d of the back right damper 402d into the third cross-over hydraulic line 464c. As a result of the weight transfer to the back/rear of the vehicle, the front left damper 402a and front right damper 402b begin to extend, causing fluid to flow out of the first rebound chamber 428a of the front left damper 402a into the third cross-over hydraulic line 464c and out of the second rebound chamber 428b of the front right damper 402b into the fourth cross-over hydraulic line 464d. With the front left, front right, back left, and back right comfort valves 444a, 444b, 444c, 444d and the first and second manifold comfort valves 460a, 460b all closed, the fluid flow out of the first rebound chamber 428a of the front left damper 402a and the second rebound chamber 428b of the front right damper 402b into the third and fourth cross-over hydraulic lines 464c, 464d increases the pressure in the back left and back right accumulators 442c, 442d, thus providing a passive pitch resistance where it becomes increasingly more difficult to compress the back left damper 402c and the back right damper 402d since the third compression chamber 426c of the back left damper 402c and the fourth compression chamber 426d of the back right damper 402d are connected in fluid communication with the third and fourth hydraulic circuits 420c, 420d.

When active or passive roll and/or pitch stiffness is not required, the four comfort valves 444a, 444b, 444c, 444d and the two manifold comfort valves 460a, 460b can be opened to enhance the ride comfort of the suspension system 400 and reduce or eliminate unwanted suspension movements resulting from the hydraulic coupling of one damper of the system to another damper of the system (e.g., where the compression of one damper causes movement and/or a dampening change in another damper). For example, when the front left comfort valve 444a is open and the front left damper 402a undergoes a compression stroke as the front wheel hits a bump, fluid may flow from the first compression chamber 426a of the front left damper 402a, into the first cross-over hydraulic line 464a, from the first cross-over hydraulic line 464a to the third cross-over hydraulic line 464c by passing through the front left bridge hydraulic line 440a and the front left comfort valve 444a, and into the first rebound chamber 428a of the front left damper 402a. Thus, fluid can travel from the first compression chamber 426a to the first rebound chamber 428a of the front left damper 402a with the only restriction coming from the dampening valves in the rebound and compression chamber ports 430a, 430b of the front left damper 402a. As such, when all of the comfort valves 444a, 444b, 444c, 444d and the manifold comfort valves 460a, 460b are open, the dampers 402a, 402b, 402c, 402d are effectively decoupled from one another for improved ride comfort. It should also be appreciated that to return the suspension system 400 to this "comfort mode" of operation, the manifold valves 422a, 422b, 422c, 422d and/or the manifold comfort valves 460a, 460b may be opened while the bi-directional pump 410 is running in a second direction where the bi-directional pump 410 draws in hydraulic fluid from the pump hydraulic line 408 and discharges hydraulic fluid into the reservoir hydraulic line 418 to produce a negative pressure in the pump hydraulic line 408 that reduces fluid pressure in the hydraulic circuits 420a, 420b, 420c, 420d of the suspension system 400.

Figure 5:
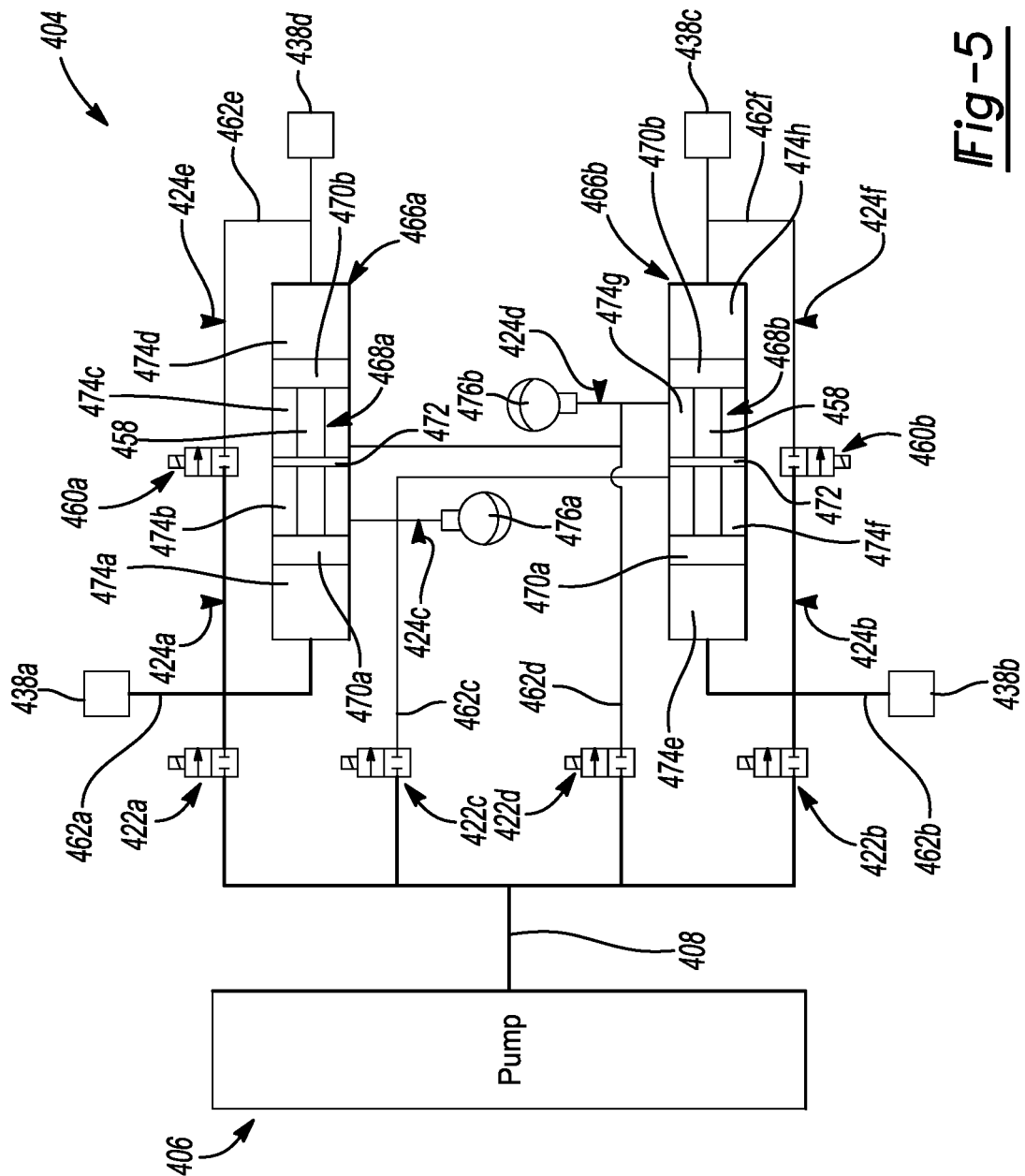
FIG. 5 is a schematic diagram illustrating the exemplary comfort valve equipped manifold assembly illustrated in FIG. 4.

FIG. 5 illustrates the manifold assembly 404 of the suspension system 400 in more detail. The manifold assembly 404 includes first and second piston bores 466a, 466b that slidingly receive first and second floating pistons 468a, 468b, respectively. Each floating piston 468a, 468b includes a piston rod 458 and first and second piston heads 470a, 470b that are fixably coupled to opposing ends of the piston rod 458. A chamber divider 472 is fixably mounted at a midpoint of each of the first and second piston bores 466a, 466b. Each chamber divider 472 includes a through-bore that slidingly receives the piston rod 458. As such, the first piston bore 466a is divided by the first floating piston 468a into a first piston chamber 474a that is arranged in fluid communication with the first manifold conduit 462a, a second piston chamber 474b disposed between the first piston head 470a of the first floating piston 468a and the chamber divider 472 in the first piston bore 466a, a third piston chamber 474c disposed between the second piston head 470b of the first floating piston 468a and the chamber divider 472 in the first piston bore 466a, and a fourth piston chamber 474d that is arranged in fluid communication with the fifth manifold conduit 462e. Similarly, the second piston bore 466b is divided by the second floating piston 468b into a fifth piston chamber 474e that is arranged in fluid communication with the second manifold conduit 462b, a sixth piston chamber 474f disposed between the first piston head 470a of the second floating piston 468b and the chamber divider 472 in the second piston bore 466b, a seventh piston chamber 474g disposed between the second piston head 470b of the second floating piston 468b and the chamber divider 472 in the second piston bore 466b, and an eighth piston chamber 474h that is arranged in fluid communication with the sixth manifold conduit 462f. Optionally, biasing members (e.g., springs) (not shown) may be placed in the second, third, sixth, and seventh piston chambers 474b, 474c, 474f, 474g to naturally bias the first and second floating pistons 468a, 468b to a centered position where the second and third piston chambers 474b, 474c and the sixth and seventh piston chambers 474f, 474g have equal volumes.

The first manifold conduit 462a is arranged in fluid communication with the first manifold hydraulic line 438a, the second manifold conduit 462b is arranged in fluid communication with the second manifold hydraulic line 438b, the fifth manifold conduit 462e is arranged in fluid communication with the fourth manifold hydraulic line 438d, and the sixth manifold conduit 462f is arranged in fluid communication with the third manifold hydraulic line 438c. The third manifold conduit 462c is arranged in fluid communication with the second and sixth piston chambers 474b, 474f while the fourth manifold conduit 462d is arranged in fluid communication with the third and seventh piston chambers 474c, 474g. As a result, fluid pressure in the fourth piston chamber 474d and thus the fifth manifold conduit 462e can be increased independently of the first manifold conduit 462a by closing the first manifold comfort valve 460a and opening the fourth manifold valve 422d when the bi-directional pump 410 is running in the first direction, which increases pressure in the third piston chamber 474c and urges the first floating piston 468a to the right in FIG. 5, decreasing the volume of the fourth piston chamber 474d and increasing the pressure in the fourth piston chamber 474d. Similarly, fluid pressure in the eighth piston chamber 474h and thus the sixth manifold conduit 462f can be increased independently of the second manifold conduit 462b by closing the second manifold comfort valve 460b and opening the fourth manifold valve 422d when the bi-directional pump 410 is running in the first direction, which increases pressure in the seventh piston chamber 474g and urges the second floating piston 468b to the right in FIG. 5, decreasing the volume of the eighth piston chamber 474h and increasing the pressure in the eighth piston chamber 474h.

Fluid pressure in the first piston chamber 474a and thus the first manifold conduit 462a can also be increased without opening the first manifold valve 422a by actuating the first floating piston 468a, where the first manifold comfort valve 460a is closed and the third manifold valve 422c is open when the bi-directional pump 410 is running in the first direction, which increases pressure in the second piston chamber 474b and urges the first floating piston 468a to the left in FIG. 5, decreasing the volume of the first piston chamber 474a and increasing the pressure in the first piston chamber 474a. Similarly, fluid pressure in the fifth piston chamber 474e and the second manifold conduit 462b can also be increased without opening the second manifold valve 422b by actuating the second floating piston 468b, where the second manifold comfort valve 460b is closed and the third manifold valve 422c is open when the bi-directional pump 410 is running in the first direction, which increases pressure in the sixth piston chamber 474f and urges the second floating piston 468b to the left in FIG. 5, decreasing the volume of the fifth piston chamber 474e and increasing the pressure in the second piston chamber 474e.

The manifold assembly 404 may further include a first manifold accumulator 476a that is arranged in fluid communication with the third manifold conduit 462c between the third manifold valve 422c and the second and sixth piston chambers 474b, 474f and a second manifold accumulator 476b that is arranged in fluid communication with the fourth manifold conduit 462d between the third and seventh piston chambers 474c, 474g. The first and second manifold accumulators 476a, 476b may be constructed in a number of different ways. For example and without limitation, the first and second manifold accumulators 476a, 476b may have accumulation chambers and pressurized gas chambers that are separated by floating pistons or flexible membranes. Under braking, fluid flow within the four hydraulic circuits generates a pressure difference between the first and second manifold accumulators 476a, 476b, which in turn causes an increase in pressure in the front left and front right accumulators 442a, 442b and provides a pitch stiffness that resists the compression of the front dampers 402a, 402b and rebound/extension of the back dampers 402c, 402d. Under acceleration, fluid flow within the four hydraulic circuits generates an opposite pressure difference between the first and second manifold accumulators 476a, 476b, which in turn causes an increase in pressure in the back left and back right accumulators 442c, 442d and provides a pitch stiffness that resists the rebound/extension of the front dampers 402a, 402b and compression of the back dampers 402c, 402d. Additional pitch resistance can be added before a braking or acceleration event by opening the third and fourth manifold valves 422c, 422d as the bi-directional pump 410 is running in the first direction. The bi-directional pump 410 draws in hydraulic fluid from the reservoir hydraulic line 418 and discharges hydraulic fluid into the pump hydraulic line 408 to produce a positive pressure in the pump hydraulic line 408, which increases fluid pressure in the first and second manifold accumulators 476a, 476b. In a similar way, the pitch stiffness of the system can be reduced before a braking or acceleration event by running the bi-directional pump 410 in the second direction while opening the third and fourth manifold valves 422c, 422d.

The manifold assembly 404 may also include six pressure sensors 424a, 424b, 424c, 424d, 424e, 424f: a first pressure sensor 424*a* arranged to monitor fluid pressure in the first manifold conduit 462*a*, a second pressure sensor 424*b* arranged to monitor fluid pressure in the second manifold conduit 462*b*, a third pressure sensor 424*c* arranged to monitor fluid pressure in the third manifold conduit 462*c*, a fourth pressure sensor 424*d* arranged to monitor fluid pressure in the fourth manifold conduit 462*d*, a fifth pressure sensor 424*e* arranged to monitor fluid pressure in the fifth manifold conduit 462*e*, and a sixth pressure sensor 424*f* arranged to monitor fluid pressure in the sixth manifold conduit 462*f*. While not shown in FIG. 5, the pressure sensors 424*a*, 424*b*, 424*c*, 424*d*, 424*e*, 424*f* are all electrically connected to the controller.

Figure 6:
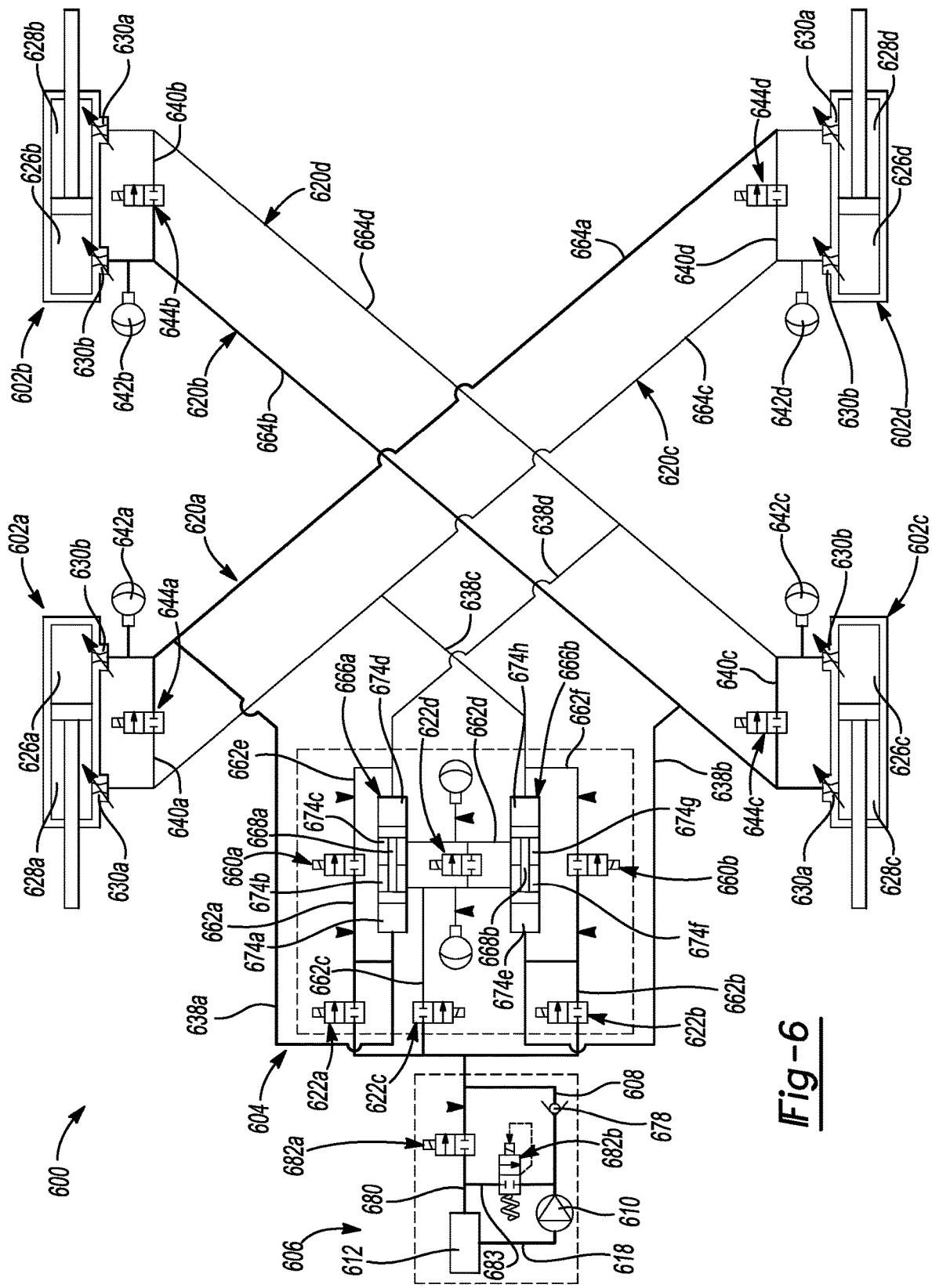
FIG. 6 is a schematic diagram illustrating another exemplary suspension system of the present disclosure that includes four hydraulic circuits connecting the front and rear dampers and another exemplary comfort valve equipped manifold assembly.

FIG. 6 illustrates another suspension system 600 that shares many of the same components as the suspension system 400 illustrated in FIGS. 4 and 5, but in FIG. 6 different pump 610 and manifold assemblies 604 have been utilized. Rather than repeat the description set forth above, the following paragraphs describe the structure and function of the components in FIG. 6 that are new and/or different from those shown and described in connection with FIGS. 4 and 5. It should be appreciated that the reference numbers in FIGS. 4 and 5 are "400" series numbers (e.g., 400, 402, 404, etc.) whereas the components in FIG. 6 that are the same or similar to the components of the suspension system 400 shown in FIGS. 4 and 5 share the same base reference numbers, but are listed as "600" series numbers (e.g., 600, 602, 604, etc.). Thus, the same description for element 400 above applies to element 600 in FIG. 6 and so on and so forth.

The pump assembly 606 illustrated in FIG. 6 includes a single direction pump 610 with an inlet port that is connected in fluid communication with the hydraulic reservoir 612 by a reservoir hydraulic line 618 and an outlet port that is connected to the pump hydraulic line 608. In operation, the single direction pump 610 draws in hydraulic fluid from the reservoir hydraulic line 618 via the inlet port and discharges hydraulic fluid into the pump hydraulic line 608 via the outlet port. As such, the single direction pump 610 produces a positive pressure in the pump hydraulic line 608 that can be used by manifold assembly 604 to increase fluid pressure in the suspension system 600. A check valve 678 is positioned in the pump hydraulic line 608 to prevent back feed when the single direction pump 610 is turned off. The pump assembly 606 also includes a return hydraulic line 680 that extends from the pump hydraulic line 108 to the hydraulic reservoir 612. A first pump valve 682*a* is positioned in-line with the return hydraulic line 680. The pump assembly 606 also includes a pump bridge hydraulic line 683 that includes a second pump valve 682*b* mounted in-line with the pump bridge hydraulic line 683. The pump bridge hydraulic line 683 connects to the pump hydraulic line 608 at a location between the single direct pump 610 and the check valve 678 and connects to the return hydraulic line 680 at a location between the first pump valve 682*a* and the hydraulic reservoir 612. In accordance with this arrangement, fluid pressure in the pump hydraulic line 608 can be increased by turning on the pump 610 and closing the second pump valve 682*b* and fluid pressure in the pump hydraulic line 608 can be decreased by turning the pump 610 off and opening the first pump valve 682*a*.

In the example illustrated in FIG. 6, only three manifold valves 622*a*, 622*b*, 622*c* (i.e., the first manifold valve 622*a*, the second manifold valve 622*b*, and the third manifold valve 622*c*) are connected in parallel with the pump hydraulic line 608. The fourth manifold valve 622*d* is positioned between the first and second piston bores 666*a*, 666*b* and is arranged in fluid communication with the third manifold conduit 662*c* on one side and the fourth manifold conduit 662*d* on the other side. Thus, to increase fluid pressure in the fifth and/or sixth manifold conduits 662*e*, 662*f* independently of the first and second manifold conduits 662*a*, 662*b*, the third and fourth manifold valves 622*c*, 622*d* must be open while the pump 610 is running and the first and second manifold comfort valves 660*a*, 660*b* are closed to increase fluid pressure in the third and seventh piston chambers 674*c*, 674*g*, which urges the first and second floating pistons 668*a*, 668*b* to the right in FIG. 6 decreasing the volume of the fourth and eighth piston chambers 674*d*, 674*h* and increasing the pressure in the fourth and eighth piston chambers 674*d*, 674*h*.

Figure 7:
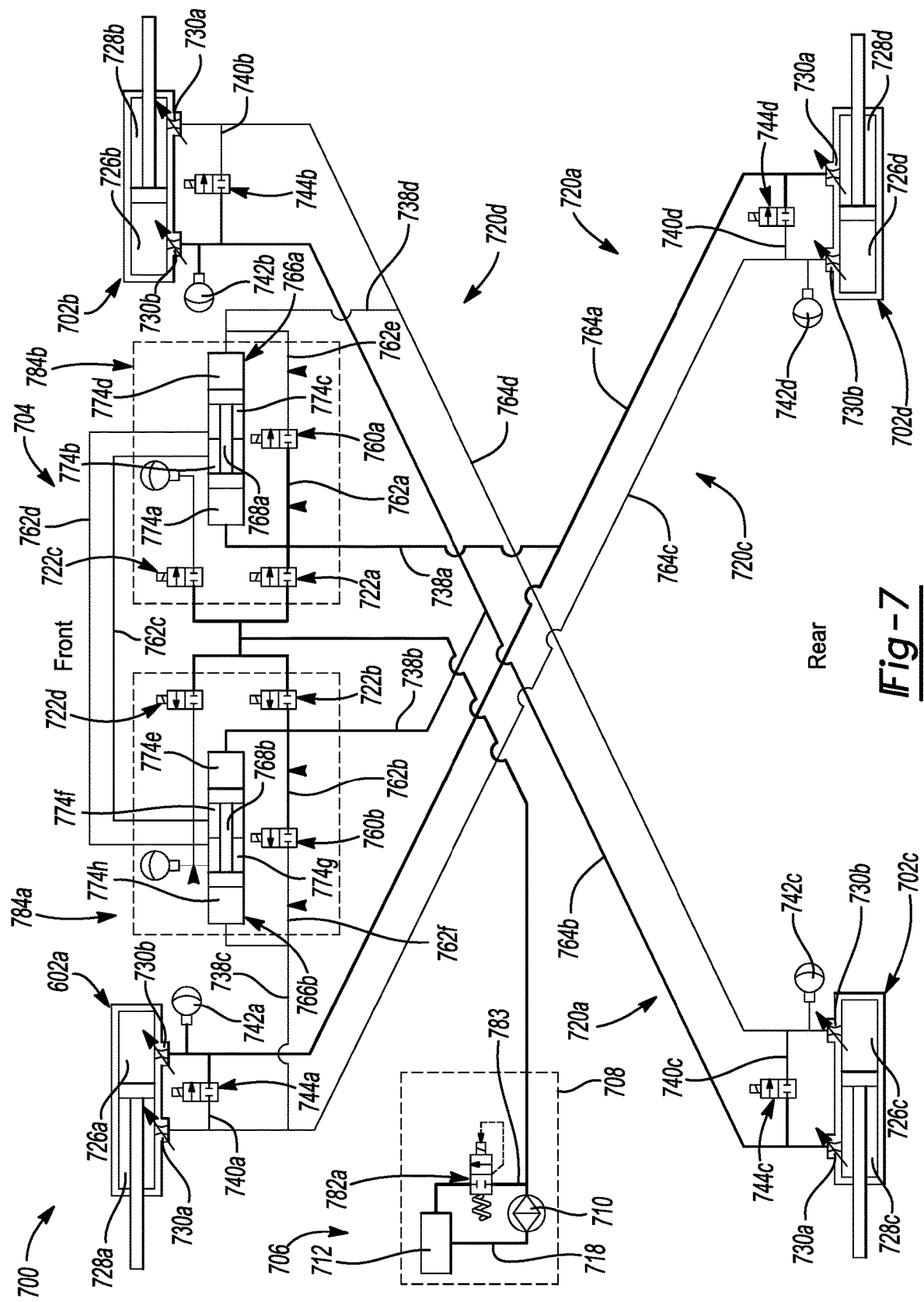
FIG. 7 is a schematic diagram illustrating another exemplary suspension system of the present disclosure that includes four hydraulic circuits connecting the front and rear dampers and another exemplary comfort valve equipped manifold assembly.

FIG. 7 illustrates another suspension system 700 that shares many of the same components as the suspension system 400 illustrated in FIGS. 4 and 5, but in FIG. 7 a different manifold assembly 704 has been utilized. Rather than repeat the description set forth above, the following paragraphs describe the structure and function of the components in FIG. 7 that are new and/or different from those shown and described in connection with FIGS. 4 and 5. It should be appreciated that the reference numbers in FIGS. 4 and 5 are "400" series numbers (e.g., 400, 402, 404, etc.) whereas the components in FIG. 7 that are the same or similar to the components of the suspension system 400 shown in FIGS. 4 and 5 share the same base reference numbers, but are listed as "700" series numbers (e.g., 700, 702, 704, etc.). Thus, the same description for element 400 above applies to element 700 in FIG. 7 and so on and so forth.

The manifold assembly 704 illustrated in FIG. 7 has the same components and hydraulic arrangement as the manifold assembly 404 illustrated in FIGS. 4 and 5, but in FIG. 7 the placement of the various components of the manifold assembly 704 is different to allow the manifold assembly 704 to be packaged in the front of the vehicle between the front dampers 702*a*, 702*b*. The manifold assembly 704 illustrated in FIG. 7 includes a front left sub-assembly 784*a* and a front right sub-assembly 784*b*. The front right sub-assembly 784*b* includes the first piston bore 766*a*, the first floating piston 768*a*, the first manifold valve 722*a*, the third manifold valve 722*c*, the first manifold conduit 762*a*, and the fifth manifold conduit 762*e*. The front left sub-assembly 784*a* includes the second piston bore 466*b*, the second floating piston 768*b*, the second manifold valve 722*b*, the fourth manifold valve 722*d*, the second manifold conduit 762*b*, and the sixth manifold conduit 762*f*. The pump hydraulic line 708 extends between the front left and front right sub-assemblies 784*a*, 784*b* and splits to connect to the manifold valves 722*a*, 722*b*, 722*c*, 722*d* on either side. The third and fourth manifold conduits 762*c*, 762*d* extend laterally between the front left and front right sub-assemblies 784*a*, 784*b* to connect the second and sixth piston chambers 774*b*, 774*f* and the third and seventh piston chambers 774*c*, 774*g*, respectively. It should be appreciated that the order and arrangement of the piston chambers 774*e*, 774*f*, 774*g*, 774*h* in the second piston bore 766*b* shown in FIG. 7 is opposite from that shown in FIGS. 4 and 5. In other words, in accordance with the arrangement shown in FIG. 7, the first piston chamber 774*a* (which is connected in fluid communication with the first manifold conduit 762*a*) faces the fifth piston chamber 774*e* (which is connection in fluid communication with the second manifold conduit 762*b*). In other words, in FIG. 7 the fifth piston chamber 774*e* (which is connection in fluid communication with the second manifold conduit 762*b*) is to the right of the eighth piston chamber 774h (which is connected in fluid communication with the sixth manifold conduit 762f), whereas in FIGS. 4 and 5 the fifth piston chamber 474e (which is connected in fluid communication with the second manifold conduit 462b) is to the left of the eighth piston chamber 474h (which is connected in fluid communication with the sixth manifold conduit 462f). This reversal of the arrangement of the piston chambers 774e, 774f, 774g, 774h in the second piston bore 766b simplifies and shortens the runs required for the manifold hydraulic lines 738a, 738b, 738c, 738d and is therefore advantageous.

Figure 8:
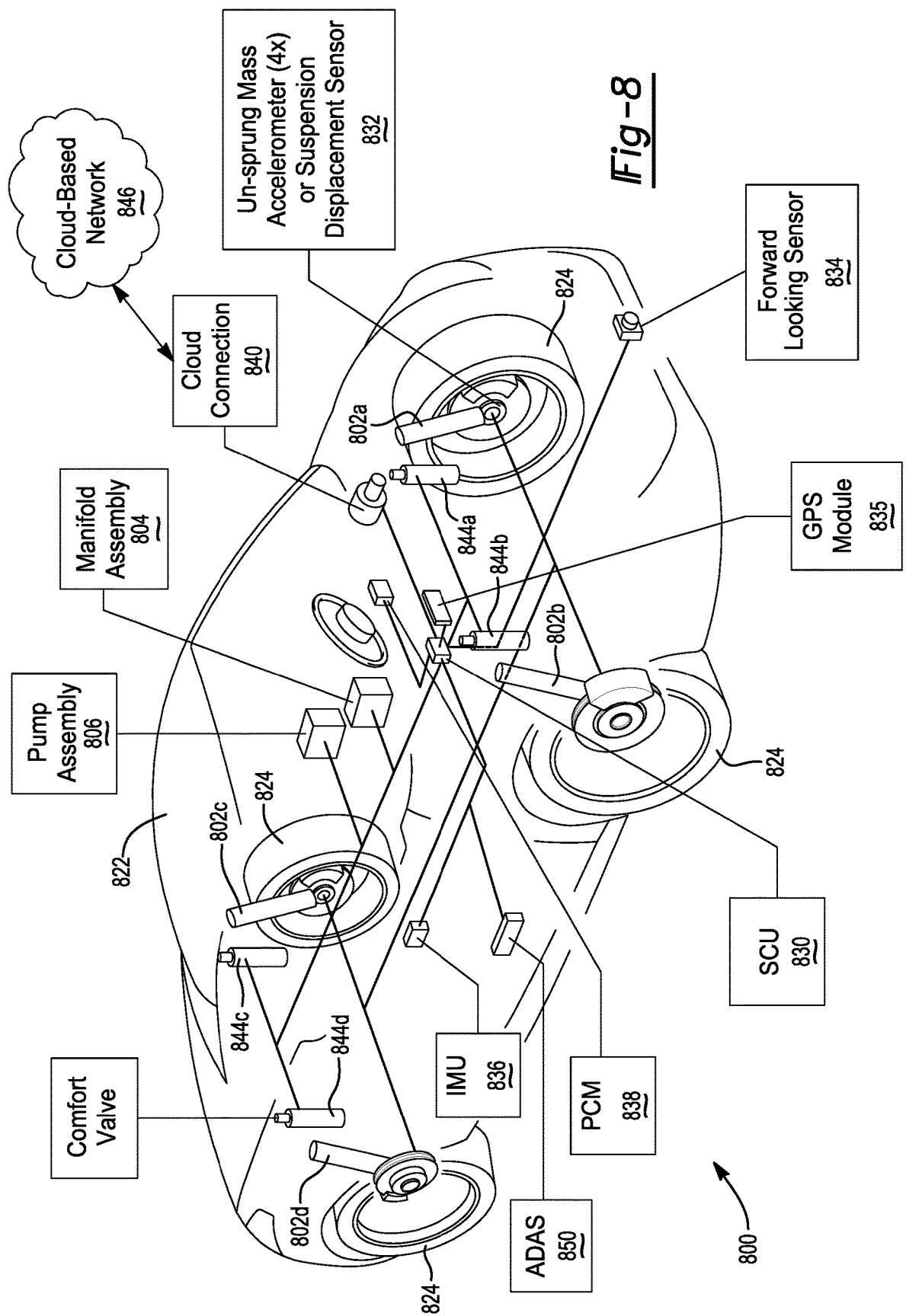
FIG. 8 is a schematic diagram illustrating a vehicle equipped with an exemplary suspension control system in accordance with the present disclosure.

With reference to FIG. 8, an exemplary vehicle 822 is illustrated that has been equipped with a suspension system 800 of the present disclosure. The vehicle 822 in FIG. 8 has been illustrated as an automobile; however, it should be appreciated that the suspension system 800 described herein is not limited to automobiles and may be used in other types of vehicles. In the illustrated example, the vehicle 822 has four wheels 824. Similarly, the suspension system 800 of the vehicle 822 includes a plurality of dampers 802a-802d, with one damper 802a-802d per wheel 824, including a front left damper 802a, a front right damper 802b, a back left damper 802c, and a back right damper 802d. The suspension system 800 of the vehicle 822 also includes a plurality of comfort valves 844a-844d, with one comfort valve 844a-844d per wheel 824. The plurality of dampers 802a-802d and the plurality of comfort valves 844a-844d are hydraulically connected to a manifold assembly 804 via a plurality of hydraulic circuits 420a-420d, which are shown in FIG. 4 rather than in FIG. 8. This is because the lines in FIG. 8 illustrate electrical connections (e.g., electric wiring), which is different from the lines in FIGS. 1-7, which illustrate hydraulic connections (e.g., hydraulic lines and conduits). However, it should be appreciated that the electronic/electrical connections described herein are not necessarily limited to wired connections, as wireless connections between various components can also be used. It should also be appreciated that any of the hydraulic arrangements shown in FIGS. 4-7 may be implemented in combination with the electrical arrangement shown in FIG. 8.

The manifold assembly 804 is hydraulically connected to a pump assembly 806 and includes a first manifold comfort valve 460a (shown in FIGS. 4 and 5) that is configured to open and close to control fluid flow between the front left damper 802a and the back left damper 802c and a second manifold comfort valve 460b (shown in FIGS. 4 and 5) that is configured to open and close to control fluid flow between the front right damper 802b and the back right damper 802d. More specifically and with reference to FIG. 4, the plurality of hydraulic circuits 420a-420d include a first hydraulic circuit 420a that extends between and fluidly connects a first compression chamber 426a of the front left damper 802a and a fourth rebound chamber 428d of the back right damper 802d, a second hydraulic circuit 420b that extends between and fluidly connects the second compression chamber 426b of the front right damper 402b and the third rebound chamber 428c of the back left damper 402c, a third hydraulic circuit 420c that extends between and fluidly connects a first rebound chamber 428a of the front left damper 402a and a fourth compression chamber 426d of the back right damper 402d, and a fourth hydraulic circuit 420d that extends between and fluidly connects a second rebound chamber 428b of the front right damper 402b and a third compression chamber 426c of the back left damper 402c. The first manifold comfort valve 460a is an electromechanical valve configured to open and close a first fluid flow path (formed by the first and fifth manifold conduits 462a and 462e) through the manifold assembly 804 that extends between and is arranged in fluid communication with the first and fourth hydraulic circuits 420a, 420d (via the first and fourth manifold hydraulic lines 438a and 438d). Similarly, the second manifold comfort valve 460b is an electromechanical valve configured to open and close a second fluid flow path (formed by the second and sixth manifold conduits 462b and 462f) through the manifold assembly 804 that extends between and is arranged in fluid communication with the second and third hydraulic circuits 420b, 420c (via the second and third manifold hydraulic lines 438b and 438c).

The suspension system 800 includes one or more onboard sensors that are configured to generate real-time vehicle data. For example, the onboard sensor(s) of the suspension system 800 may include one or more un-sprung mass accelerometers 832 and/or suspension displacement sensors (not shown) positioned at each wheel 824 of the vehicle 822 and one or more forward-looking road scanning sensors 834. The suspension system 800 also includes a suspension control unit (SCU) 830, an inertial measurement unit (IMU) 836, a powertrain control module (PCM) 838, and a cloud connection 840 or other form of wireless communication interface. The suspension control unit (SCU) 830 includes one or more processors or controllers configured to execute computer programs to control the suspension system by implementing the control methods described below and memory that is programmed with the aforementioned computer programs and control methods.

The unsprung mass accelerometers 832 and/or suspension displacement sensors may be mounted to the wheel knuckle, axle, control arm, swing arm, damper, or other components that support and move up and down with the wheel 824 as the wheel 824 travels over road irregularities, such as bumps and pot-holes. Alternatively, the unsprung mass accelerometers 832 and/or suspension displacement sensors may be mounted to the wheels 824 themselves. The unsprung mass accelerometers 832 and/or suspension displacement sensors are arranged in electronic communication with the suspension control unit (SCU) 830 and are configured to provide unsprung mass acceleration data and/or suspension displacement (i.e., wheel travel) data to the suspension control unit (SCU) 830.

Although a wide variety of different sensor types and combinations may be used, in the illustrated example the forward-looking road scanning sensor 834 is mounted near the bumper of the vehicle 822. The forward-looking road scanning sensor 834 is arranged in electronic communication with the suspension control unit (SCU) 830 and is configured to provide sensor data about approaching road irregularities to the suspension control unit 830 (SCU). By way of example and without limitation, the forward-looking road scanning sensor 834 could be LiDAR, RADAR, an optical sensor like a camera, or an acoustic sensor like an ultrasonic sensor.

The suspension system 800 also includes a global positioning system (GPS) module 835, an inertial measurement unit (IMU) 836, and a powertrain control module (PCM) 838, which are mounted in the vehicle 822 and may be shared across other systems of the vehicle 822, including for example, one or more advanced driver assistance systems (ADAS) 850. The global positioning system (GPS) module 835 is arranged in electronic communication with the suspension control unit (SCU) 830 and is programmed to retrieve a vehicle location. The inertial measurement unit (IMU) 836 is arranged in electronic communication with the suspension control unit (SCU) 830 and is configured to provide sprung mass acceleration data to the suspension control unit (SCU) 830. As such, the inertial measurement unit (IMU) 836 may include one or more accelerometers that are mounted to the vehicle body for measuring linear and/or longitudinal accelerations of the sprung mass of the vehicle 822 and one or more gyroscopes or magnetometers for providing tilt (i.e., pitch) measurements and heading references. The powertrain control module (PCM) 838 is arranged in electronic communication with a vehicle speed sensor (VSS) and the suspension control unit (SCU) 830 and is configured to provide vehicle speed data to the suspension control unit (SCU) 830. Although other forms of sensors may be used, the vehicle speed sensor (VSS) may be a wheel speed sensor, for example. Alternatively, the suspension control unit (SCU) 830 may receive the vehicle speed data directly from the vehicle speed sensor (VSS) or the global positioning system (GPS) module 835.

The cloud connection 840 is arranged in electronic communication with the suspension control unit (SCU) 830 and a cloud-based network 846. The cloud connection 840 may be provided in the form of a transceiver that is configured to communicate with one or more cellular networks, WiFi networks, and/or communication satellites, for example. The cloud connection 840 enables the suspension control unit (SCU) 830 to communicate wirelessly with the cloud-based network 846 where information and data related to road surfaces, vehicle operating parameters, and suspension settings can be stored and subsequently retrieved. For example, the cloud connection 840 in the illustrated example is configured to provide road classification data that is stored in the cloud-based network 846 to the suspension control unit (SCU) 830 based upon the vehicle location data provided by the global positioning system (GPS) module 835 of the vehicle 822.

The road classification data may be based on, for example, a classification index that grades a stretch of road (i.e., a road or road segment) based on the roughness of the road surface. For example, ISO 8608 and ISO 13473 provide industry standards for classifying the roughness of a road. The road classification data may also be provided as a map layer or overlay to navigational mapping used by the global positioning system (GPS) module 835. Because many vehicles may be connected to the cloud-based network 846, the road classification data may be based, at least in part, on information or data that is transmitted to the cloud-based network 846 by other vehicles after traveling over and/or encountering a particular stretch of road or road event.

The suspension control unit (SCU) 830 is arranged in electronic communication with the first and second manifold comfort valves 460a, 460b of the manifold assembly 804, the pump assembly 806, the other comfort valves 844a-844d, and the advanced driver assistance system (ADAS) 850. The memory of the suspension control unit (SCU) 830 is programmed with a pitch stiffness control regime that is configured to open and close the first and second manifold comfort valves 460a, 460b on demand to activate and deactivate passive pitch stiffness within the suspension system 800. As will be explained in great detail below, the memory of the suspension control unit 830 is also programmed to: determine if the vehicle 822 is traveling on a classified road based on the vehicle location retrieved by the global positioning system (GPS) module 835, retrieve a road roughness classification from the cloud connection 840 if the vehicle 822 is traveling on a classified road, determine if the road roughness classification is outside an acceptable roughness range that is stored in the memory of the suspension control unit (SCU) 830, and open the first and second manifold comfort valves 460a, 460b to disable the passive pitch stiffness of the suspension system 800 for a particular time interval (t) if the road roughness classification is outside the acceptable roughness range.

As will also be explained below, the memory of the suspension control unit (SCU) 830 is additionally programmed to: monitor the real-time vehicle data generated by the onboard sensor(s) 832, 834, determine if a discrete road event is approaching based upon the real-time vehicle data, and open the first and second manifold comfort valves 460a, 460b to disable the passive pitch stiffness of the suspension system 800 for a particular time interval (t) if the suspension control unit (SCU) 830 determines that a discrete road event is approaching based on the real-time vehicle data. The suspension control unit (SCU) 830 is also programmed to store discrete road events experienced by the vehicle 822 and associated locations of the vehicle in memory as saved road events. In this way, the suspension control unit (SCU) 830 can learn of discrete road events by traveling over them in the first instance and then anticipate the discrete road event if the vehicle 822 is approaching the same location at a later time. As discussed above, the suspension control unit (SCU) 830 can also unload saved road events to the cloud-based network 846 using the cloud connection 840 for the benefit of other vehicles connected to the cloud-based network 846. As will be explained in greater detail below, the suspension control unit (SCU) 830 is programmed to determine if a discrete road event is approaching based upon a combination of the vehicle location and a saved road event stored in the memory of the suspension control unit (SCU) 830 and open the first and second manifold comfort valve 460a, 460b to disable the passive pitch stiffness of the suspension system 800 for a particular time interval (t) if the suspension control unit determines that a discrete road event is approaching based on the vehicle location and the saved road event.

The advanced driver assistance system (ADAS) 850 is programmed to electronically communicate a driver assistance system active intervention status to the suspension control unit (SCU) 830. The memory of the suspension control unit (SCU) 830 is further programmed to determine if it is safe/unsafe to hold the first and second manifold comfort valves 460a, 460b open when the driver assistance system active intervention status indicates that the advanced driver assistance system (ADAS) 850 is currently implementing a corrective action to control the vehicle 822. By way of example and without limitation, the advanced driver assistance system (ADAS) 850 may include a stability control system, anti-lock braking system, anti-rollover system, anti-lane departure system, and/or collision avoidance system.

Figure 9:
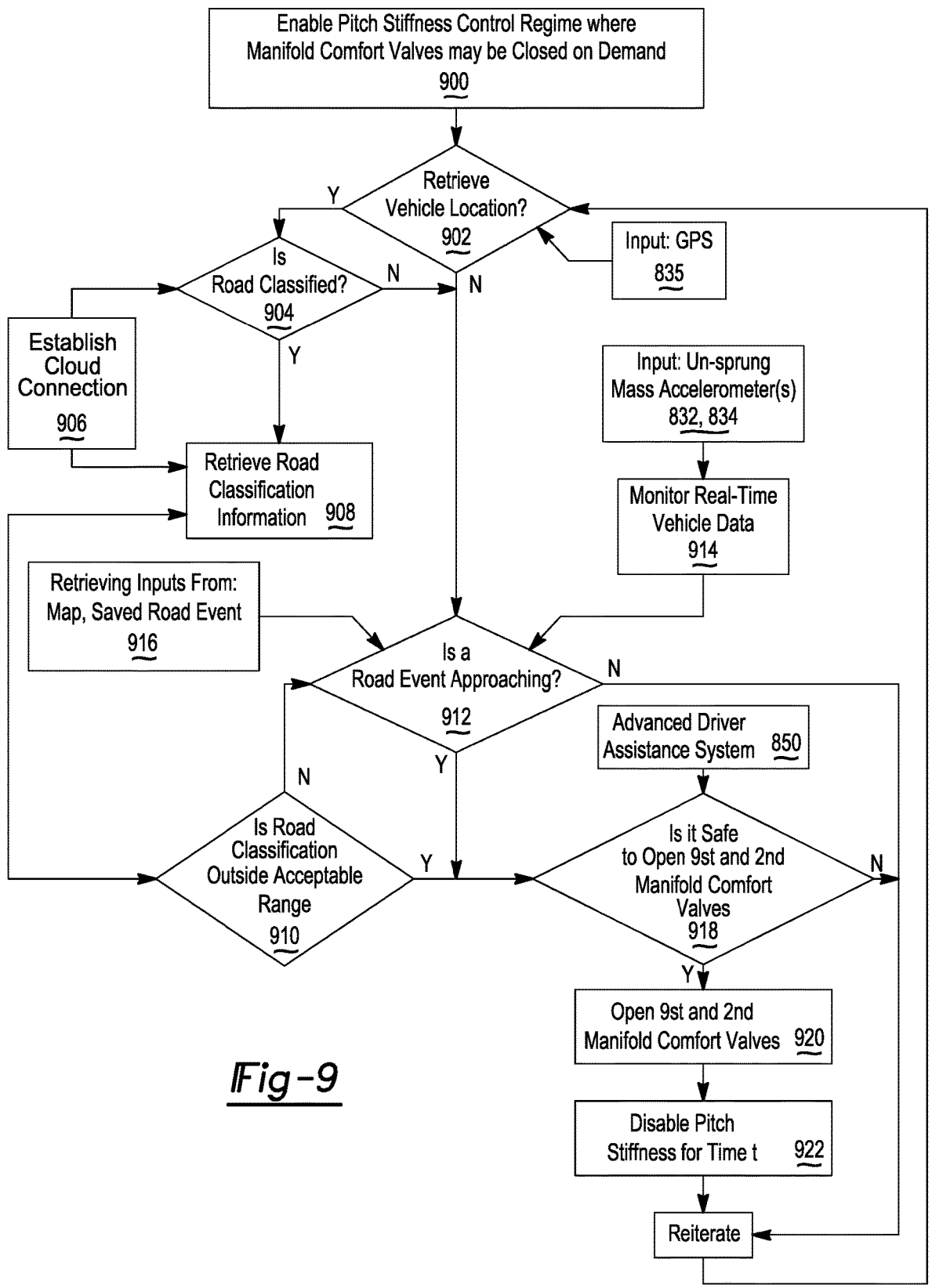
FIG. 9 is a flow diagram illustrating an exemplary method of controlling the exemplary suspension system described in the present disclosure.

FIG. 9 illustrates a method of controlling the suspension system 800 described above. The method includes step 900, which involves enabling the pitch stiffness control regime that is stored in the memory 844 of the suspension control unit (SCU) 830 such that the suspension control unit (SCU) 830 may close the first and/or second manifold comfort valves 460a, 460b on demand to increase the pitch stiffness of the suspension system 800, as needed. As part of the pitch stiffness control regime, the suspension control unit (SCU) 830 generates and sends control signals to the first and second manifold comfort valves 460a, 460b to open and close the first and second manifold comfort valves 460a, 460b on demand to activate and deactivate passive pitch stiffness within the suspension system. At step 902, the method attempts retrieving the vehicle location from the global positioning system (GPS) module 835 mounted in the vehicle 822. If the vehicle location can be retrieved, the suspension control unit (SCU) 830 performs step 904, which involves determining if the vehicle 822 is traveling on a classified road. At step 906, the method includes establishing the cloud connection 840 between the suspension control unit (SCU) 830 and the cloud-based network 846, which provides road classification data to the suspension control unit (SCU) 830 so that it may determine if the road the vehicle 822 is traveling on is classified at step 904. Thus, step 904 of determining whether the road is classified is based on the vehicle location retrieved from the global positioning system (GPS) module 835 and the road classification data retrieved from the cloud connection 840. If the vehicle 822 is traveling on a classified road, the method goes onto step 908 of retrieving road classification information from the cloud-based network 846, including retrieving the road roughness classification from the cloud-based network 846.

If the stretch of road the vehicle 822 is traveling on is classified, the suspension control unit (SCU) 830 performs step 910, which involves determining if the road roughness classification is outside an acceptable roughness range for the suspension system 800. As explained above, the road roughness classification may be represented on a numerical index or scale that is based on the roughness of the road surface and the acceptable roughness range may be stored in the memory 844 of the suspension control unit (SCU) 830. The acceptable roughness range may be a pre-set range of values based on the design criteria of the vehicle 822 and pre-established ride comfort goals or may be dynamically adjusted or calculated by the suspension control unit (SCU) 830 based on the real-time vehicle data.

If the road roughness classification retrieved from the cloud-based network 846 for the road the vehicle 822 is traveling on is outside of the acceptable roughness range, then the suspension control unit (SCU) 830 will jump ahead to step 918, which is described below. If the vehicle location cannot be retrieved from the global positioning system (GPS) module 835, if the stretch of road the vehicle 822 is traveling on is not classified, or if the road roughness classification is within the acceptable roughness range, then the suspension control unit (SCU) 830 moves onto step 912, which involves determining if a discrete road event is approaching. Such discrete road events are localized irregularities in the road surface that can have a substantial impact on the suspension system 800 and therefore the ride comfort, including for example, pot-holes and speed bumps. At step 914, the suspension control unit (SCU) 830 receives and monitors the real-time vehicle data from the onboard sensor(s) 832, 834 and uses this data in step 912 of determining if a discrete road event is approaching. For example, the suspension control unit (SCU) 830 may receive and monitor sensor data about approaching road irregularities from the forward-looking road scanning sensor(s) 834 mounted to the vehicle 822, sprung mass acceleration data from the inertial measurement unit (IMU) 836, un-sprung mass acceleration data from the un-sprung mass accelerometers 832, and/or suspension displacement data from the suspension displacement sensors. At step 912, the suspension control unit (SCU) 830 determines if a road event is approaching in two ways. One way the suspension control unit (SCU) 830 determines if a road event is approaching is based upon the monitoring of the real-time vehicle data from the onboard sensor(s) 832, 834. If the real-time vehicle data signals or registers a discrete road event (i.e., a bump or pot-hole), the suspension control unit (SCU) 830 will determine that a road event is approaching and may also store the discrete road event and an associated location of the vehicle in the memory of the suspension control unit (SCU) 830 as a saved road event. The saved road event may also be uploaded to the cloud-based network 846 via the cloud connection 840 for use by other vehicles. At step 916, the suspension control unit (SCU) 830 retrieves any saved road events that may be approaching from the memory of the suspension control unit (SCU) 830, the mapping layer in the vehicle's navigation system, or the cloud-based network 846. Accordingly, the other way the suspension control unit (SCU) 830 can determine if a road event is approaching at step 912 is by comparing the vehicle location and the associated locations of saved road events retrieved from the memory of the suspension control unit (SCU) 830, the mapping layer in the vehicle's navigation system, or the cloud-based network 846.

If the suspension control unit (SCU) 830 determines that no road event is approaching, the suspension control unit (SCU) 830 reiterates the method described above by going back to step 902 of attempting to retrieve a new vehicle location. However, when the suspension control unit (SCU) 830 determines that a road event is approaching, the suspension control unit (SCU) 830 moves to step 918, which is described below.

The advanced driver assistance system (ADAS) 850 is configured to intervene in the control of the vehicle 822 by initiating a corrective action when activated. For example, the advanced driver assistance system (ADAS) 850 may override or initiate throttle, brake, and/or steering inputs as part of a corrective action. If the suspension control unit (SCU) 830 determines that the road roughness classification is outside the acceptable roughness range at step 910 or that a discrete road event is approaching at step 912, then the suspension control unit (SCU) 830 performs step 918 of determining if it is safe/unsafe to hold the first and second manifold comfort valves 460a, 460b open. If the suspension control unit (SCU) 830 determines that it is safe to open both the first and second manifold comfort valves 460a, 460b, then the suspension control unit (SCU) 830 performs step 920 of opening the first and second manifold comfort valves 460a, 460b to disable the passive pitch stiffness of the suspension system 800 for a particular time interval (t), which is illustrated as step 922. However, if the suspension control unit (SCU) 830 determines that it is unsafe to open both the first and second manifold comfort valves 460a, 460b, then the suspension control unit (SCU) 830 overrides step 920 to keep the passive pitch stiffness of the suspension system 800 enabled so that the corrective action being taken by the advanced driver assistance system (ADAS) 850 is not interrupted, altered, or otherwise affected by an opening of the first and second manifold comfort valves 460a, 460b. If the suspension control unit (SCU) 830 overrides step 920, the suspension control unit (SCU) 830 reiterates the method described above by going back to step 902 of attempting to retrieve a new vehicle location.

As part of step 920, the suspension control unit (SCU) 830 may determine if the first and second manifold comfort valves 460a, 460b are in a closed position or an open position, generate one or more control signals, and send the control signal(s) to the first and second manifold comfort valves 460a, 460b if the first and second manifold comfort valves 460a, 460b are in the closed position. In other words, the control signal(s) generated by the suspension control unit (SCU) 830 may operate to actuate the first and second manifold comfort valves 460a, 460b to place the first and second manifold comfort valves 460a, 460b in the open position. This disables the passive pitch stiffness of the suspension system 800 for the particular time interval (t), which may be a set valve, calculated by the suspension control unit (SCU) 830 based on the real-time vehicle data or vehicle speed, or selected from a look-up table in accordance with step 922. After step 922, the suspension control unit (SCU) 830 reiterates the method described above by going back to step 902 of attempting to retrieve a new vehicle location.

Many other modifications and variations of the present disclosure are possible in light of the above teachings and may be practiced otherwise than as specifically described while within the scope of the appended claims.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In the present disclosure, including in the definitions below, the term "module" or the "controller" may be replaced with the term "circuit." The term "module" may refer to, be part of, or include: an Application term Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of controlling a suspension system of a vehicle, comprising:
connecting a manifold assembly to a plurality of dampers via a plurality of hydraulic circuits, the plurality of dampers including at least one front damper and at least one rear damper, and the manifold assembly including at least one manifold comfort valve configured to control fluid flow between the front and rear dampers;
enabling a pitch stiffness control regime where the at least one manifold comfort valve is open and closed on demand to activate and deactivate passive pitch stiffness within the suspension system;
retrieving a vehicle location and determining if the vehicle is traveling on a classified road based on the vehicle location;
retrieving the road classification information if the vehicle is traveling on a classified road, the road classification information including a road roughness classification;
determining if the road roughness classification is outside an acceptable roughness range;
opening the at least one manifold comfort valve to disable the passive pitch stiffness of the suspension system for a particular time interval if the road roughness classification is outside the acceptable roughness range; and
determining if the at least one manifold comfort valve is in a closed position or an open position,
wherein the opening the at least one manifold comfort valve to disable the passive pitch stiffness of the suspension system for a particular time interval includes generating at least one control signal and sending the at least one control signal to the at least one manifold comfort valve if the at least one manifold comfort valve is in the closed position,
wherein the at least one control signal actuates the at least one manifold comfort valve to place the at least one manifold comfort valve in the open position.

2. A method of controlling a suspension system of a vehicle, comprising:
connecting a manifold assembly to a plurality of dampers via a plurality of hydraulic circuits, the plurality of dampers including at least one front damper and at least one rear damper, and the manifold assembly including at least one manifold comfort valve configured to control fluid flow between the front and rear dampers;
enabling a pitch stiffness control regime where the at least one manifold comfort valve is open and closed on demand to activate and deactivate passive pitch stiffness within the suspension system;
retrieving a vehicle location;
monitoring real-time vehicle data from at least one of an accelerometer, a suspension displacement sensor, and a road scanning sensor disposed onboard the vehicle;
determining if a discrete road event is approaching based upon the real-time vehicle data or a combination of the vehicle location and a saved road event stored in memory; and
opening the at least one manifold comfort valve to disable the passive pitch stiffness of the suspension system for a particular time interval if a discrete road event is approaching;
determining if it is unsafe to hold the at least one manifold comfort valves open based on data from a driver assistance system if a discrete road event is approaching; and
overriding the opening the at least one manifold comfort valve to keep the passive pitch stiffness of the suspension system enabled if it is determined to be unsafe to hold the at least one manifold control valve open for the particular time interval,
wherein the driver assistance system includes at least one of a stability control system, an anti-lock braking system, an anti-rollover system, an anti-lane departure system, and a collision avoidance system that is configured to intervene in the control of the vehicle by initiating a corrective action when activated and wherein it is determined that it is unsafe to hold the at least one manifold comfort valves open for the particular time interval if a corrective action has been initiated by the driver assistance system.

3. The method as set forth in claim 2, further comprising:
determining if the vehicle is traveling on a classified road based on the vehicle location;
retrieving the road classification information from a cloud connection if the vehicle is traveling on a classified road, the road classification information including a road roughness classification;
determining if the road roughness classification is outside an acceptable roughness range for the suspension system; and
opening the at least one manifold comfort valve to disable the passive pitch stiffness of the suspension system for a particular time interval if the road roughness classification is outside the acceptable roughness range.

4. The method as set forth in claim 2, further comprising:
storing the discrete road event and an associated location of the vehicle in memory as a saved road event.

5. The method as set forth in claim 2, further comprising the steps of:
determining if a discrete road event is approaching based upon a combination of the vehicle location and a saved road event stored in memory; and
opening the at least one manifold comfort valve to disable the passive pitch stiffness of the suspension system for a particular time interval if a discrete road event is approaching.

6. The method as set forth in claim 2, further comprising:
determining if the at least one manifold comfort valve is in a closed position or an open position,
wherein the opening the at least one manifold comfort valve to disable the passive pitch stiffness of the suspension system for a particular time interval includes generating at least one control signal and sending the at least one control signal to the at least one manifold comfort valve if the at least one manifold comfort valve is in the closed position, wherein the at least one control signal actuates the at least one manifold comfort valve to place the at least one manifold comfort valve in the open position.

7. A suspension system of a vehicle, comprising:
a plurality of dampers connected to a manifold assembly via a plurality of hydraulic circuits;
said plurality of dampers including a front left damper, a front right damper, a back left damper, and a back right damper;
said manifold assembly including a first manifold comfort valve configured to open and close to control fluid flow between said front left damper and said back left damper and a second manifold comfort valve configured to open and close to control fluid flow between said front right damper and said back right damper;
a GPS module programmed to retrieve a vehicle location;
a suspension control unit arranged in electronic communication with said first and second manifold comfort valves and programmed with a pitch stiffness control regime that is configured to open and close said first and second manifold comfort valves on demand to activate and deactivate passive pitch stiffness within the suspension system; and
a driver assistance system that is arranged in electronic communication with said suspension control unit and that is programmed to electronically communicate a driver assistance system active intervention status to said suspension control unit,
wherein said suspension control unit is programmed to determine if it is unsafe to hold said first and second manifold comfort valves open when said driver assistance system active intervention status indicates that said driver assistance system is currently implementing a corrective action to control the vehicle,
said suspension control unit is programmed to determine if the vehicle is traveling on a classified road based on said vehicle location, retrieve a road roughness classification if the vehicle is traveling on a classified road, determine if said road roughness classification is outside an acceptable roughness range for the suspension system, and open said first and second manifold comfort valves to disable said passive pitch stiffness of the suspension system for a particular time interval if said road roughness classification is outside said acceptable roughness range.

8. The suspension system as set forth in claim 1, further comprising:
at least one onboard sensor that is configured to generate real-time vehicle data and that arranged in electronic communication with said suspension control unit,
wherein said at least one onboard sensor is at least one un-sprung mass accelerometer, a suspension displacement sensor, and a forward-looking road scanning sensor,
wherein said suspension control unit is programmed to monitor said real-time vehicle data generated by said at least one onboard sensor, determine if a discrete road event is approaching based upon said real-time vehicle data, and open said first and second manifold comfort valves to disable said passive pitch stiffness of the suspension system for a particular time interval if said suspension control unit determines that a discrete road event is approaching based on said real-time vehicle data.

9. The suspension system as set forth in claim 8, wherein said suspension control unit includes memory and said suspension control unit is programmed to store discrete road events and associated locations of the vehicle in said memory as saved road events.

10. The suspension system as set forth in claim 9, wherein said suspension control unit is programmed to determine if a discrete road event is approaching based upon a combination of said vehicle location and a saved road event stored in said memory and open said first and second manifold comfort valves to disable said passive pitch stiffness of the suspension system for a particular time interval if said suspension control unit determines that a discrete road event is approaching based on said vehicle location and said saved road event.

11. A suspension system of a vehicle, comprising:
a plurality of dampers connected to a manifold assembly via a plurality of hydraulic circuits;
said plurality of dampers including a front left damper, a front right damper, a back left damper, and a back right damper;
said manifold assembly including a first manifold comfort valve configured to open and close to control fluid flow between said front left damper and said back left damper and a second manifold comfort valve configured to open and close to control fluid flow between said front right damper and said back right damper;
a GPS module programmed to retrieve a vehicle location;
a suspension control unit arranged in electronic communication with said first and second manifold comfort valves and programmed with a pitch stiffness control regime that is configured to open and close said first and second manifold comfort valves on demand to activate and deactivate passive pitch stiffness within the suspension system,
said suspension control unit is programmed to determine if the vehicle is traveling on a classified road based on said vehicle location, retrieve a road roughness classification if the vehicle is traveling on a classified road, determine if said road roughness classification is outside an acceptable roughness range for the suspension system, and open said first and second manifold comfort valves to disable said passive pitch stiffness of the suspension system for a particular time interval if said road roughness classification is outside said acceptable roughness range;
a first hydraulic circuit that extends between and fluidly connects a first compression chamber of said front left damper and a fourth rebound chamber of said back right damper;
a second hydraulic circuit that extends between and fluidly connects said second compression chamber of said front right damper and said third rebound chamber of said back left damper;
a third hydraulic circuit that extends between and fluidly connects a first rebound chamber of said front left damper and a fourth compression chamber of said back right damper; and
a fourth hydraulic circuit that extends between and fluidly connects a second rebound chamber of said front right damper and a third compression chamber of said back left damper,
wherein said first manifold comfort valve is an electromechanical valve configured to open and close a first fluid flow path through said manifold assembly that extends between and is arranged in fluid communication with said first and fourth hydraulic circuits and said second manifold comfort valve is an electromechanical valve configured to open and close a second fluid flow path through said manifold assembly that extends between and is arranged in fluid communication with said second and third hydraulic circuits.

\* \* \* \* \*